(12) United States Patent
Tanaka et al.

(10) Patent No.: US 8,041,232 B2
(45) Date of Patent: Oct. 18, 2011

(54) OPTICAL TRANSMITTER AND CONTROL METHOD THEREOF

(75) Inventors: Akihiro Tanaka, Tokyo (JP); Akio Tajima, Tokyo (JP); Seigo Takahashi, Tokyo (JP); Wakako Maeda, Tokyo (JP)

(73) Assignee: NEC Corporation, Tokyo (JP)

( * ) Notice: Subject to any disclaimer, the term of this patent is extended or adjusted under 35 U.S.C. 154(b) by 692 days.

(21) Appl. No.: 12/190,923

(22) Filed: Aug. 13, 2008

(65) Prior Publication Data

US 2009/0074425 A1 Mar. 19, 2009

(30) Foreign Application Priority Data

Sep. 4, 2007 (JP) .................................. 2007-228510

(51) Int. Cl.
*H04B 10/04* (2006.01)
(52) U.S. Cl. .......... 398/185; 398/182; 398/183; 398/201
(58) Field of Classification Search .......... 398/182–185, 398/201
See application file for complete search history.

(56) References Cited

U.S. PATENT DOCUMENTS

| | | | |
|---|---|---|---|
| 6,781,741 B2* | 8/2004 | Uesaka .......................... | 359/279 |
| 7,277,603 B1* | 10/2007 | Roberts et al. .................... | 385/1 |
| 7,349,636 B2* | 3/2008 | Zitelli ........................... | 398/185 |
| 7,773,283 B2* | 8/2010 | Tanaka et al. .................. | 359/237 |
| 7,899,338 B2* | 3/2011 | Hashimoto et al. ........... | 398/198 |
| 7,953,303 B2* | 5/2011 | Gheorma et al. ................. | 385/3 |
| 2002/0191886 A1* | 12/2002 | Castoldi et al. ................ | 385/14 |
| 2007/0212075 A1* | 9/2007 | Yin ............................... | 398/183 |
| 2007/0248362 A1* | 10/2007 | Tanaka et al. ................. | 398/189 |
| 2009/0129719 A1* | 5/2009 | Rowinski et al. ................ | 385/2 |

OTHER PUBLICATIONS

G. Ribordy et al.; "Automated 'plug & play' quantum key distribution"; Electronics Letters, Oct. 29, 1998, vol. 34, No. 22, pp. 2116-2117.
Z.L. Yuan et al.; "Continuous operation of a one-way quantum key distribution system over installed telecom fibre"; Optics Express, vol. 13, pp. 660-665.
G. Bonfrate et al.; "Asymmetric Mach-Zehnder germano-silicate channel waveguide interferometers for quantum cryptography systems"; Electronics Letters, Jun. 21, 2001, vol. 37, No. 13, pp. 846-847.
Y. Nambu et al.; "One-Way Quantum Key Distribution System Based on Planar Lightwave Circuits"; Japanese Journal of Applied Physics, vol. 45, No. 6A, 2006, pp. 5344-5348.
Y. Nambu et al.; "Quantum Key Distribution Systems without Optical Switching using Planar Lightwave Circuit"; The 8th International Conference on Quantum Communication, Measurement and Computing, p. 2-31.

(Continued)

*Primary Examiner* — Kennneth N Vanderpuye
*Assistant Examiner* — Tanya Ngo
(74) *Attorney, Agent, or Firm* — Dickstein Shapiro LLP

(57) ABSTRACT

An optical transmitter which modulates the phases and intensities of double pulses and then transmits them, includes a branching section which branches each of the input double pulses to first and second paths, a first optical modulator placed in the first path, second and third optical modulators placed in series in the second path, and a combining section which combines the double pulses having traveled through the first path with the double pulses having traveled through the second path to output double pulses. A control section controls such that each of the first and second optical modulators performs any one of relative intensity modulation and relative phase modulation on the double pulses passing through, and the third optical modulator performs relative phase modulation on the double pulses passing through.

25 Claims, 13 Drawing Sheets

OTHER PUBLICATIONS

C. H. Bennett et al.; "Quantum Cryptography: Public Key Distribution an Coin Tossing"; Proceedings of the IEEE International Conference on Computers, Systems and Signal Processing, Bangalore, India (1984), pp. 175-179.

S. Hayase et al.; "Proposal of 8-State per Symbol (Binary ASK and QPSK) 30-Gbit/s Optical Modulation / Demodulation Scheme"; ECOC 2003, Th. 2.6.4.

* cited by examiner

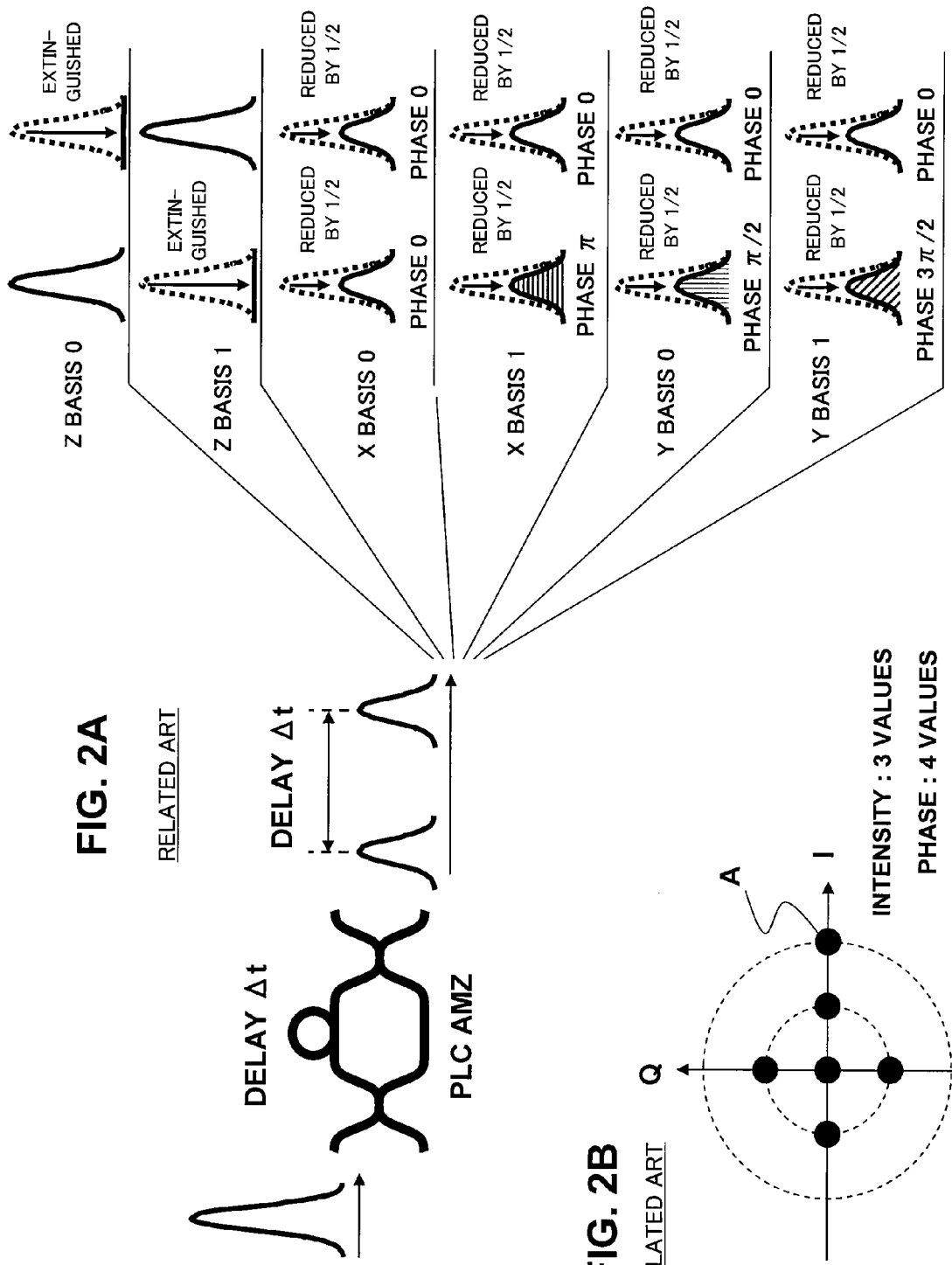

FIRST EXAMPLARY EMBODIMENT

FIG. 9A
SECOND EXAMPLARY EMBODIMENT
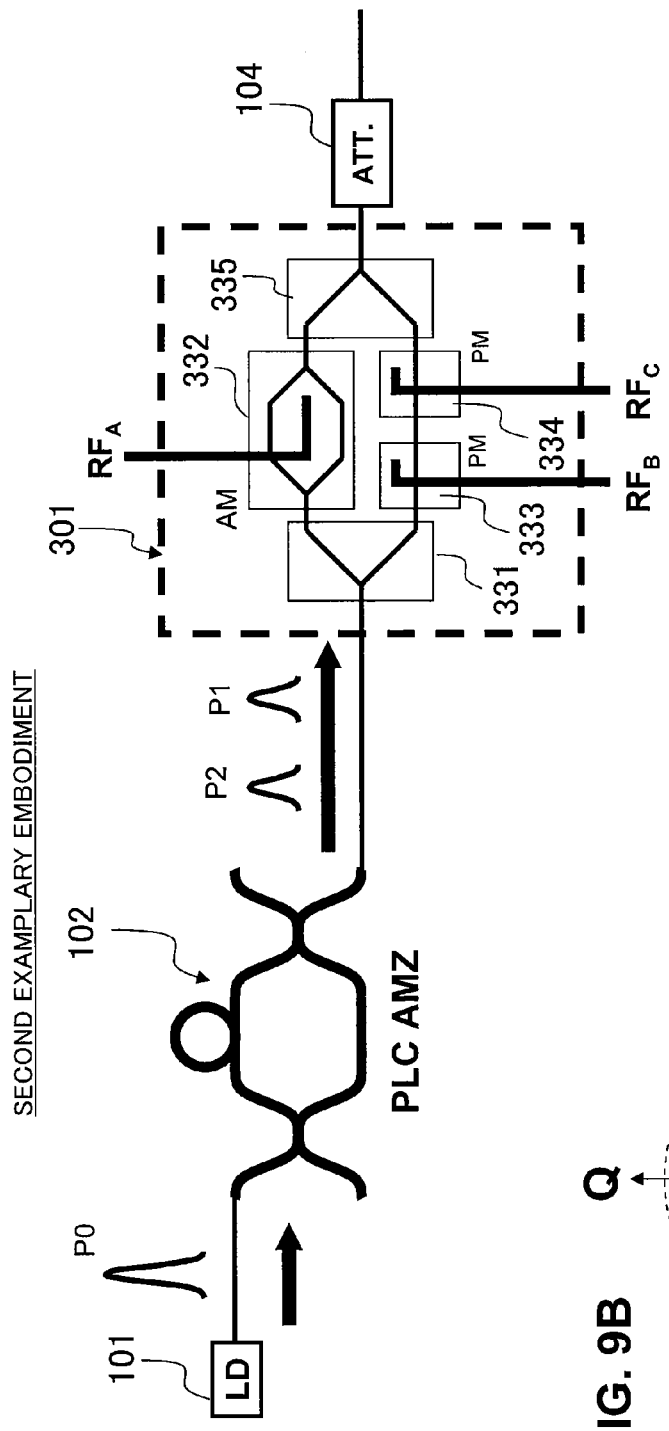
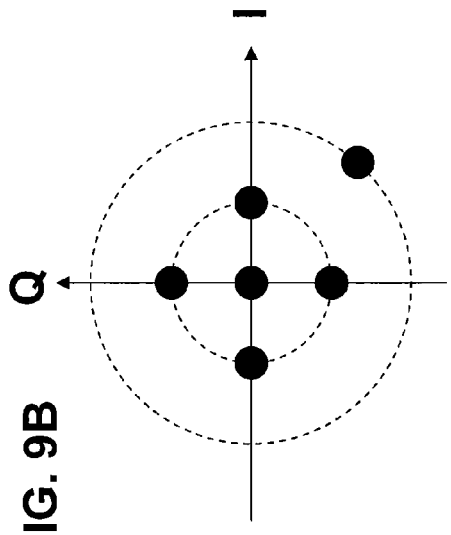
FIG. 9B

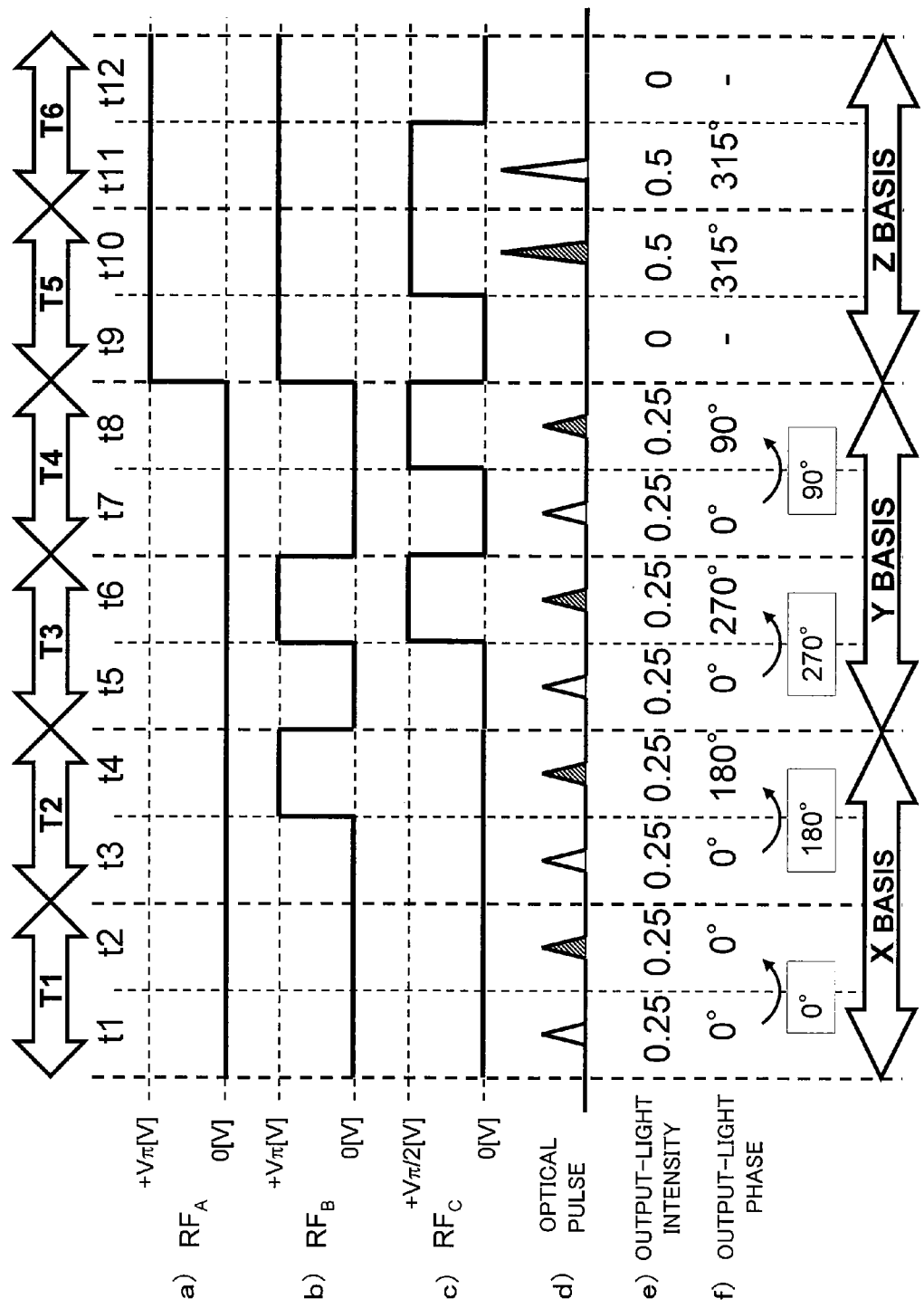

THIRD EXAMPLARY EMBODIMENT

MODIFIED EXAMPLE

OPTICAL TRANSMITTER AND CONTROL METHOD THEREOF

BACKGROUND OF THE INVENTION

1. Field of the Invention

This application is based upon and claims the benefit of priority from Japanese Patent Application No. 2007-228510, filed on Sep. 4, 2007, the disclosure of which is incorporated herein in its entirety by reference.

The present invention relates to an optical communication system in which an optical pulse is phase- and intensity-modulated and then transmitted and, more particularly, to an optical transmitter and a method for controlling a composite modulator used in the optical transmitter.

2. Description of the Related Art

The Internet, which is growing rapidly, is convenient, but, in actual fact, there is great apprehension about its security. The necessity for high-degree cryptographic technologies is ever increasing to maintain secrecy in communication. The cryptographic methods that are currently used in general are broadly classified into secret key cryptography, such as Data Encryption Standard (DES) and Triple DES, and public key cryptography, such as Rivest Shamir Adleman (RAS) and elliptic curve cryptography (ECC). However, these are cryptographic communication methods that guarantee the security of communication based on computational complexity. Ciphers according to these methods are in constant jeopardy of being broken with the advent of vast computing power or a cryptanalysis algorithm. In such a background, quantum key distribution (QKD) is attracting attention as a cryptographic key distribution technique that makes eavesdropping absolutely impossible.

In QKD, a photon is generally used as a medium of communication, and information is transmitted by being superposed on the quantum state of a photon. If an eavesdropper existing on a transmission path eavesdrops on the information by, for example, tapping a photon being transmitted, it is impossible to perfectly return the quantum state of the once-observed photon to the state before observation, according to Heisenberg's uncertainty principle. This causes a change in the statistics of the reception data detected by an authorized receiver. The detected change allows the receiver to detect the presence of the eavesdropper on the transmission path.

In the case of a quantum key distribution method utilizing the phase of a photon, a sender and a receiver (hereinafter, referred to as "Alice" and "Bob," respectively) organize an optical interferometer. Alice and Bob individually modulate the phase of each photon at random. Based on the depth difference between the modulated phases, an output of "0," "1," or "indeterminate" can be obtained. Thereafter, the conditions used when output data were measured are partly compared between Alice and Bob, whereby a sequence of random numbers can be finally shared between Alice and Bob. The sequence of random numbers shared here includes errors caused by external disturbances such as photon-receiver noises, noises leaking from a classical-channel signal, and noises caused depending on the precision of the interferometer. In addition, it should be thought that the sequence of random numbers also includes errors caused by an act of eavesdropping committed by an eavesdropper (hereinafter, referred to as "Eve"). Therefore, to obtain a final cryptographic key, Alice and Bob carry out error correction for eliminating the errors in the shared sequence of random numbers and privacy amplification for sifting out the information that Eve may possess.

For the configuration most suitable for practical use, a plug and play system is frequently used, which is shown in Ribordy, G., Gautier, J.-D., Gisin, N., Guinnard, O., and Zbinden, H. ("Automated 'plug & play' quantum key distribution," Electronics Letters, Vol. 34, No. 22, pp. 2116-2117), and others. In a plug and play system, an optical interferometer of a round-trip type is constructed so that a single interferometer functions as an interferometer for temporally separating a photon pulse and an interferometer for combining the temporally separated photon pulse pair again. Accordingly, this system has the merit that high-precision interference can be achieved if the optical path difference made in the interferometer is kept constant for a period of time longer than the duration of a round trip of a photon pulse.

However, QKD methods of such a round-trip type are unsuitable to increase the key sharing rate because phase modulators for modulating the phase of a photon pulse need to be used in two ways. In addition, there is also a demerit that the signal-to-noise ratio of a photon signal is degraded because the occurrence of backscattering light in a transmission path is inevitable.

On the other hand, according to QKD methods of a one-way type, a sender and a receiver have different asymmetric interferometers respectively. That is, the interferometer for temporally separating a photon pulse and the interferometer for combining the temporally separated photon pulse pair again are placed at distant locations. Accordingly, some techniques are needed to keep the optical path differences made in the multiple interferometers precisely equal. For example, Yuan, Z. L. and Shields, A. J. ("Continuous operation of a one-way quantum key distribution system over installed telecom fibre," Optics Express, Vol. 13, pp. 660-665), discloses a system in which a fiber stretcher is provided to one of the paths of the asymmetric interferometer on Bob's side and the length difference between the optical paths of the asymmetric interferometer is adjusted by controlling the fiber stretcher while monitoring interference characteristics.

However, since optical fiber has a linear expansion coefficient ranging from $10^{-6}$ to $10^{-5}$/K, an optical fiber line with a length of 100 cm (corresponding to a delay of 5 ns) extends/contracts approximately 100 to 1000 nm, with a 0.1-degree change in temperature. Since an optical signal to be used in QKD and general optical communication has a wavelength of 1550 nm, if an asymmetric interferometer having a delay of several nanoseconds is used, stable interference characteristics cannot be obtained unless temperature control of the entire optical fiber for delay is performed with a granularity smaller than 0.01 degrees. According to Bonfrate, G., Harlow, M., Ford, C., Maxwell, G., and Townsend, P. D. ("Asymmetric Mach-Zehnder germano-silicate channel waveguide interferometers for quantum cryptography systems," Electronics Letters, Vol. 37, No. 13, pp. 846-847), optical paths are installed in a small area by using planar lightwave circuit (PLC) technology, whereby temperature control is facilitated.

As described above, techniques have been gradually established for stabilizing the relative delay amounts in multiple interferometers, which has been a challenge in implementing one-way QKD. In response to this trend, one-way QKD has begun to develop in various ways in recent years. For example, Nambu, Y., Yoshino, K., and Tomita, A. ("One-Way Quantum Key Distribution System Based on Planar Lightwave Circuits," Japanese Journal of Applied Physics, Vol. 45, pp. 5344-5348) proposes a first one-way QKD system using a general two-input, two-output Mach-Zehnder interferometer. A second one-way QKD system using no phase modulator is also proposed in Nambu, Y., Yoshino, K., and Tomita, A. ("Quantum key distribution systems without optical switching using planar lightwave circuit," The 8th International Conference on Quantum Communication, Measurement and Computing, pp. 2-31). Both of these schemes are embodiments of the BB84 protocol using four quantum states (see Bennett, C. H. and Brassard, G., "QUANTUM CRYPTOGRAPHY: PUBLIC KEY DISTRIBUTION AND COIN TOSSING" in Proceedings of the IEEE International Conference on Computers, Systems, and Signal Processing, Bangalore (1984), pp. 175-179). Next, the first and second one-way QKD systems will be described.

FIG. 1A is a block diagram schematically showing the first one-way QKD system. According to the scheme shown in FIG. 1A (hereinafter, referred to as "scheme A"), four phase states are used.

First, an optical pulse generated by a light source 11 on Alice's side is temporally separated into a temporally separated pulse pair (hereinafter, referred to as double pulses) by a PLC asymmetric Mach-Zehnder (AMZ) interferometer 12, and the phase difference between these double pulses is modulated into any one of four states ($0$, $\pi/2$, $\pi$, and $3\pi/2$) by phase modulators 13 and 14. Hereinafter, a coding set of phase differences of 0 and $\pi$ will be referred to as "X basis," and a coding set of phase differences of $\pi/2$ and $3\pi/2$ will be referred to as "Y basis."

In Bob, the phase difference between the double pulses received from Alice is modulated again into 0 or $-\pi/2$ by a phase modulator 16. Thereafter, the result of interference of the double pulses, which are combined by a PLC AMZ interferometer 17, is detected by one of photon detectors $APD_1$ and $APD_2$.

In the scheme A, there are two methods to carry out four-state phase modulation on Alice's side: a method by which a single phase modulator is driven with four values, and a method by which two phase modulators are driven each with two values. The former method, by which a single phase modulator is driven with four values, has the merit of reducing the space and power consumption of the sender because only one phase modulator is required. However, this method also has a demerit as follows. In a high-speed transmission system in which the system repetition rate exceeds 1 GHz, it is difficult to set each of the levels of four-valued driving signals with high precision, and each of the phase states of 0, $\pi/2$, $\pi$, and $3\pi/2$ is deteriorated in precision, resulting in the key generation efficiency being degraded. On the other hand, according to the latter method, by which two phase modulators are driven each with two values, the four phase states can be generated with high precision by individually controlling the amplitude of each of the two-valued signals.

FIG. 1B is a block diagram schematically showing the second one-way QKD system. In the scheme shown in FIG. 1B (hereinafter, referred to as "scheme B"), two phase states and two time states are used.

First, on Alice's side, using a four-input, two-output PLC AMZ interferometer 21, optical pulses from light sources LD1 to LD4 are input to four input ports respectively. In the case of an optical pulse input from the light source LD1, since the optical pulse travels along only a long path of the interferometer 21, only a single pulse temporally delayed is sent out to a transmission line. In the case of an optical pulse input from the light source LD4, since the optical pulse travels along only a short path of the interferometer 21, only a single pulse relatively advanced is sent out to the transmission line. In the case of optical pulses input from the light sources LD2 and LD3, the X or Y basis can be generated depending on the phase difference between the optical pulses traveling along the long and short paths of the PLC AMZ interferometer 21. On Bob's side, each basis is decoded by using a two-input, four-output PLC AMZ interferometer 23 and detected by using one of photon detectors $APD_{Z1}$, $APD_1$, $APD_2$, and $APD_{Z2}$.

Hereinafter, a coding set corresponding to the case where only one of the double pulses exists as in the case of using the light source LD1 or LD4 will be referred to as "Z-basis." Note that the optical intensity of each of the double pulses made when the X or Y basis is selected is half the optical intensity made when the Z basis is selected because the total sum of the optical intensities of the double pulses needs to be equal to the optical intensity made when the Z basis is selected.

That is, according to the scheme B, a selection is made from the four light sources LD1 to LD4 to generate an optical pulse on Alice's side, and a photon is detected by using one of the photon detectors $APD_{Z1}$, $APD_1$, $APD_2$, and $APD_{Z2}$ on Bob's side, whereby it is possible to determine a bit and basis at the same time.

With respect to the configuration of the receiver, the schemes A and B each has a merit and demerit. The scheme B has the merit that it is possible to increase the distance and speed by an amount equivalent to a loss caused by a phase modulator because no phase modulator is required on Bob's side, but has the demerit that the power consumption is large because four photon detectors are required. On the other hand, the scheme A has a merit in terms of power consumption because only two photon detectors are used, but has the demerit of being unsuitable to increase the distance and speed due to the loss attributable to the phase modulator on Bob's side. Accordingly, considering the merits and demerits of the schemes A and B, a desirable sender is a transmitter that is applicable to both schemes. However, such a transmitter that can be applied to both the schemes A and B has not hitherto been proposed.

Moreover, in the scheme B shown in FIG. 1B, four light sources LD1 to LD4 are required. However, as a practical problem, it is extremely difficult to make the spectra of light output from the four light sources perfectly match. If the deviation is large, Eve can correctly determine a quantum state being transmitted by measuring wavelength deviation and thus can duplicate the quantum state without leaving any trace of eavesdropping.

To make the sender configuration according to the scheme B shown in FIG. 1B applicable to the scheme A shown in FIG. 1A, if multiple modulators are simply placed at an output of the PLC AMZ interferometer 21 on Alice's side, four modulators are required. This will be described with reference to FIGS. 2A and 2B.

FIG. 2A is a conceptual diagram collectively showing the modulations that are required to prepare the X, Y and Z bases. FIG. 2B is a signal constellation diagram showing the signal points according to the modulations shown in FIG. 2A. Referring to FIG. 2A, output from the two-input, two-output PLC AMZ interferometer 12 according to the scheme A are double pulses of the same intensity. When Z-basis modulation is performed, one of these double pulses is completely extinguished by using an intensity modulator. When X- or Y-basis modulation is performed, the intensities of both pulses are reduced by half by using an intensity modulator, and at the same time, it is necessary to produce a phase difference between the double pulses by using phase modulators. That is, four-state phase modulation (in steps of $\pi/2$) is needed to correspond with the receiver according to the scheme A, and three-state (0, ½, 1) intensity modulation is needed to correspond also with the receiver according to the scheme B. In FIG. 2B, required signal points are plotted on an IQ plane.

Referring to FIG. 2B, the phase of a point A does not need to be zero because the phase state of a Z-basis optical pulse is not restricted. Therefore, the point A can be any point on the same-intensity circle with as long a radius as the distance from the original point of the IQ plane to the point A. To realize such modulation, it is possible to utilize a modulation method described in Hayase, S., Kikuchi, N., Sekine, K., and Sasaki, S. ("Proposal of 8-state per Symbol (Binary ASK and QPSK) 30-Gbit/s Optical Modulation/Demodulation Scheme," ECOC 2003, Th.2.6.4). Hayase et al. discloses a modulator configured by using three optical modulators in total (two phase modulators and one intensity modulator) to implement 8-state (four values in phase and two values in intensity) amplitude phase shift keying (APSK) modulation.

FIG. 3A is a block diagram depicting the configuration of an ASK-QPSK transmitter described in Hayase et al. and FIG. 3B is a signal constellation diagram showing the signal points according to this transmitter.

Three modulators in total (a phase modulator 32 for (0, $\pi$) modulation, a phase modulator 33 for (0, $\pi/2$) modulation, and an intensity modulator 34 for ($\frac{1}{2}$, 1) modulation) are connected in cascade on the output side of a light source 31 as shown in FIG. 3A, whereby the required signal constellation on the IQ plane as shown in FIG. 3B can be prepared. However, when comparing the signal constellation in FIG. 3B with the signal constellation in FIG. 2B, there is no signal point of an intensity of 0 in FIG. 3B. Therefore, to supply this signal point, it is necessary to add one more intensity modulator. Specifically, an intensity modulator for (0, 1) modulation needs to be connected in cascade on the output side of the light source 31 in addition to the phase modulator 32 for (0, $\pi$) modulation, phase modulator 33 for (0, $\pi/2$) modulation, and intensity modulator 34 for ($\frac{1}{2}$, 1) modulation.

As described above, if an attempt is made to obtain a signal constellation as shown in FIG. 2B by utilizing the configuration of the transmitter according to Hayase et al., four optical modulators are required in total. It is desirable that the number of modulators to be used be as smalls as possible from the viewpoint of power consumption and space saving.

SUMMARY OF THE INVENTION

An object of the present invention is to provide an optical transmitter with a new configuration that can accomplish modulation with three values in intensity and four values in phase by using a reduced number of modulators, as well as a method for controlling a composite modulator used in the optical transmitter.

According to the present invention, an optical transmitter for transmitting optical pulses which are phase-modulated and intensity-modulated, includes: a light source for generating optical pulses; a double-pulse generator for generating double pulses from an optical pulse, wherein the double pulses are a temporally separated optical pulse pair; a branching section for branching each of the double pulses into a first path and a second path; a first optical modulator provided on the first path; a second optical modulator and a third optical modulator which are provided in series on the second path; and a combining section for combining double pulses having traveled through the first path and double pulses having traveled through the second path to generate an output double pulses, wherein each of the first optical modulator and the second optical modulator performs either relative intensity modulation or relative phase modulation between double pulses passing through, wherein the third optical modulator performs relative phase modulation between double pulses passing According to the present invention, modulation with three values in intensity and four values in phase can be accomplished by using three optical modulators.

BRIEF DESCRIPTION OF THE DRAWINGS

FIG. 2A is a conceptual diagram collectively showing modulations required to prepare X, Y and Z bases.

FIG. 2B is a signal constellation diagram representing the signals according to the modulations shown in FIG. 2A.

FIG. 9A is a block diagram showing the schematic configuration of an optical transmitter according to a second exemplary embodiment of the present invention.

FIG. 9B is a signal constellation diagram representing the signals according to the transmitter shown in FIG. 9A.

FIG. 10 is a schematic diagram showing the relationship between driving voltages and output-light intensity/phase, to describe a method for driving a composite modulator used in the second exemplary embodiment of the present invention.

DETAILED DESCRIPTION OF THE PREFERRED EMBODIMENTS

A composite modulator to be used in an optical transmitter according to the present invention includes a branching section provided at the input end of the composite modulator and a combining section provided at the output end thereof. The branching section branches each one of input double pulses to two paths. The combining section combines the double pulses from one of the paths with the double pulses from the other one of the paths. The first optical modulator is placed in one of the paths, and the second and third optical modulators are placed in series in the other one of the paths. The optical transmitter, when necessary, attenuates the double pulses after combining and sends them out as double pulses at a single-photon level, for example. Hereinafter, the present invention will be described in detail by using an example in which the main configuration of a Mach-Zehnder interferometer is applied to the composite modulator.

Figure 4:
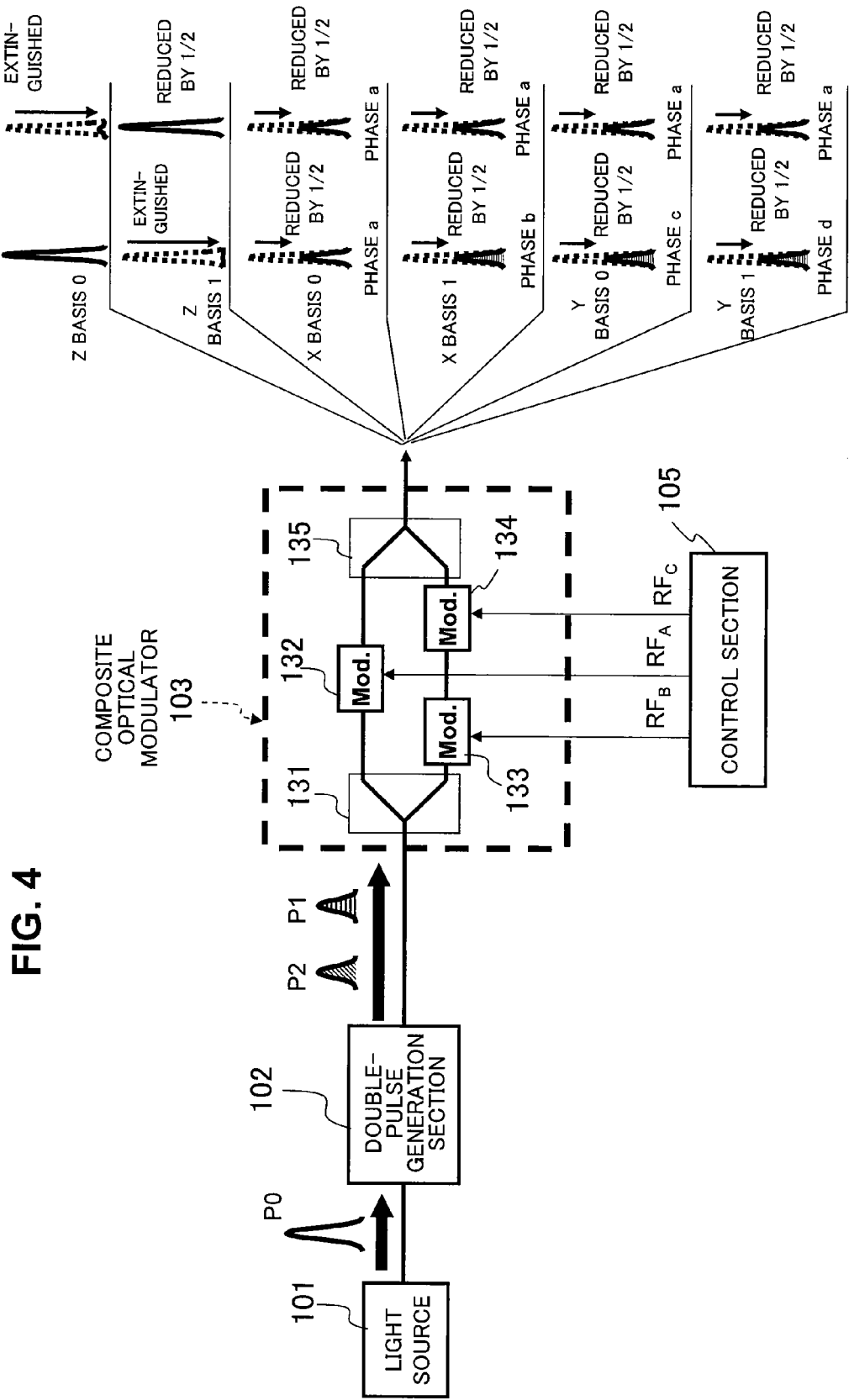
FIG. 4 is a block diagram showing the schematic configuration of an optical transmitter that is an application example of the present invention.

FIG. 4 is a block diagram showing the schematic configuration of an optical transmitter that is an application example of the present invention. An optical pulse P0 generated by a light source 101 is split into double pulses P1 and P2 by a double-pulse generation section 102. The double pulses P1 and P2 are modulated in X, Y or Z basis by a composite modulator 103. The composite modulator 103 is controlled by driving signals $RF_A$, $RF_B$, and $RF_C$ from a control section 105, which will be described later. The optical intensities of the double pulses modulated by the composite modulator 103 are attenuated to a single-photon level when necessary, and then the double pulses are sent out to a transmission line.

The composite modulator 103 has two paths (first and second paths) between an optical branching section 131 and an optical combining section 135. A first optical modulator 132 is placed in the first path, and a second optical modulator 133 and third optical modulator 134 are placed in the second path. Each of the double pulses P1 and P2 input from the double-pulse generation section 102 is branched in the two paths by the optical branching section 131. The double pulses traveling along the first path pass through the first optical modulator 132, and the double pulses traveling along the second path pass through the second optical modulator 133 and third optical modulator 134. The double pulses having traveled along each path are combined with their counterparts at the light combining section 135, whereby modulation with three values (0, ½, 1) in intensity and four values (a, b, c, d) in phase can be accomplished. For example, each of the first optical modulator 132 and second optical modulator 133 (or third optical modulator 134) is allowed to operate as any one of an intensity modulator and a phase modulator (which changes the modulation phase by 180°). The third optical modulator 134 (or second optical modulator 133) is allowed to operate as a phase modulator which changes the modulation phase by 90°.

In the present application example, at least one of the second optical modulator 133 and third optical modulator 134 in the second path is a phase modulator, and the other optical modulator in the second path and the first optical modulator 132 in the first path are any combination of an intensity modulator and a phase modulator. It is preferable that the two paths, optical branching section 131, and optical combining section 135 constitute a Mach-Zehnder interferometer.

Moreover, it is preferable that the intensity modulator be one using a Mach-Zehnder interferometer as will be described later. As for the phase modulator, it is also possible to use a Mach-Zehnder-type modulator, but the phase modulator is not limited to this type. The Mach-Zehnder-type modulator to be used here is a general Mach-Zehnder-type LN ($LiNbO_3$) modulator, and intensity modulation or phase modulation can be performed on an optical pulse by controlling driving voltage RF, which will be described later.

The composite modulator 103 is driven by the control section 105. Here, the first optical modulator 132, second optical modulator 133, and third optical modulator 134 are driven by using the driving signals $RF_A$, $RF_B$, and $RF_C$, respectively. The control section 105 generates the driving signals $RF_A$, $RF_B$, and $RF_C$ individually, in accordance with which of intensity modulation and phase modulation each optical modulator performs.

Moreover, the light source 101 is a laser diode, for example, and outputs an optical pulse P0. The double-pulse generation section 102 is an interferometer of a planar-lightwave-circuit asymmetric-Mach-Zehnder (PLC AMZ) type, Michelson type, or the like, for example. The control section 105 can also be implemented by executing a program on a program-controlled processor such as CPU.

Figure 1A:
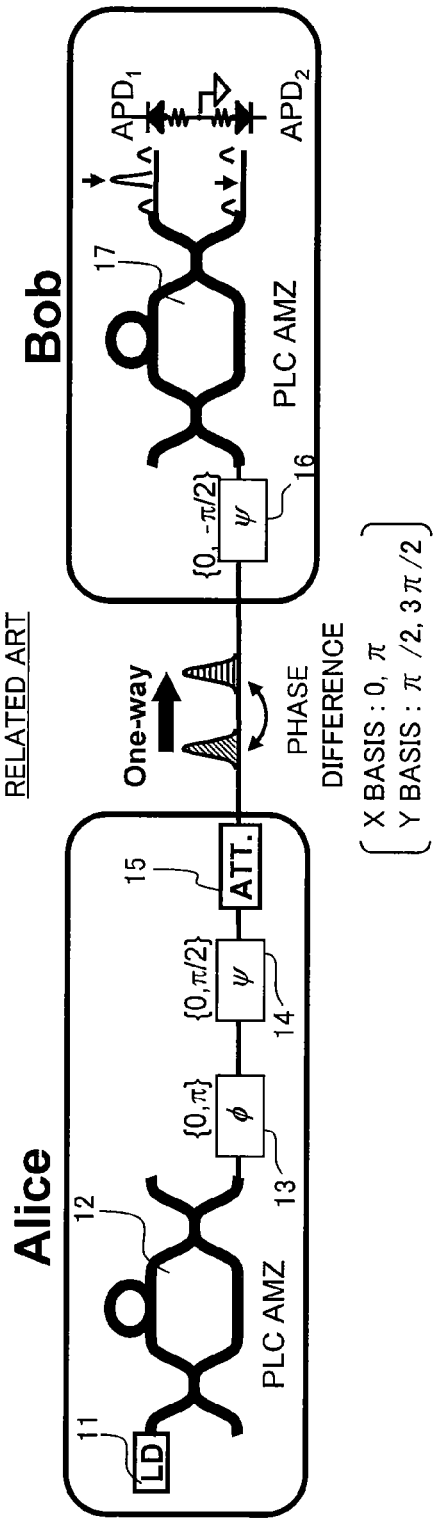
FIG. 1A is a block diagram schematically showing a one-way QKD system disclosed in Nambu, Y., Yoshino, K., and Tomita, A., "One-Way Quantum Key Distribution System Based on Planar Lightwave Circuits," Japanese Journal of Applied Physics, Vol. 45, pp. 5344-5348.

As will be described in the following exemplary embodiments in detail, double pulses are modulated with three values in intensity and four values in phase as shown in FIGS. 2A and 2B by the composite modulator 103 composed of the above-described three optical modulators, whereby an optical transmitter applicable to both of the scheme A shown in FIG. 1A and the scheme B shown in FIG. 1B can be realized.

1. First Exemplary Embodiment

According to a first exemplary embodiment of the present invention, a composite modulator includes a Mach-Zehnder intensity modulator placed in one of the paths (arms) of a Mach-Zehnder interferometer, and a Mach-Zehnder intensity modulator and phase modulator placed in the other path (the other arm). That is, in FIG. 4, the first optical modulator 132 and second optical modulator 133 are Mach-Zehnder intensity modulators, and the third optical modulator 134 is a phase modulator.

1.1) Configuration

Figure 5A:
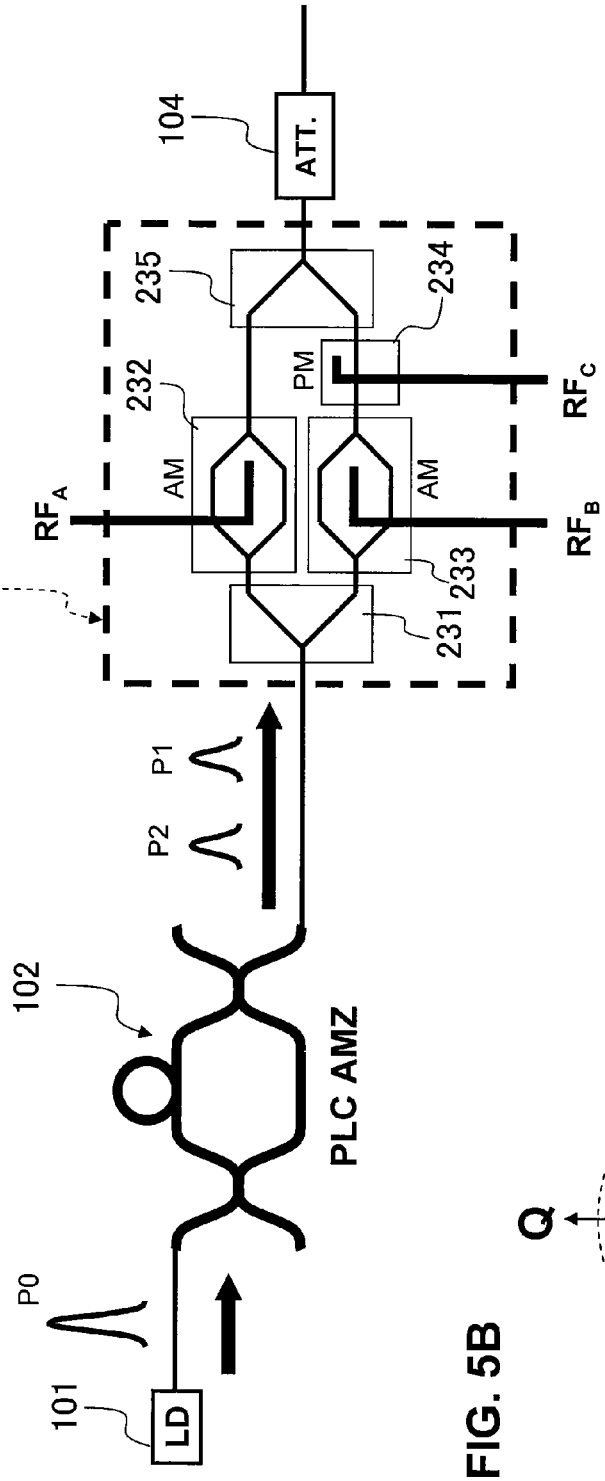
FIG. 5A is a block diagram showing the schematic configuration of an optical transmitter according to a first exemplary embodiment of the present invention.
Figure 5B:
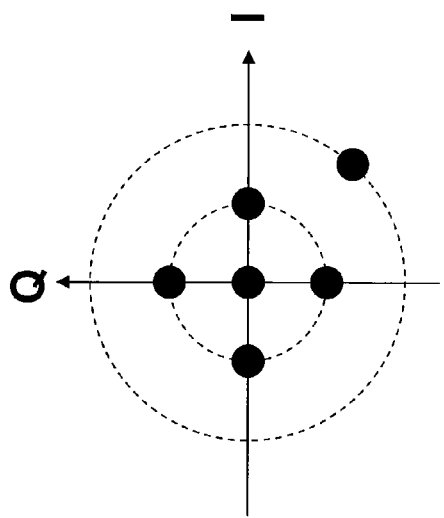
FIG. 5B is a signal constellation diagram representing the signals according to the transmitter shown in FIG. 5A.

FIG. 5A is a block diagram showing the schematic configuration of an optical transmitter according to the first exemplary embodiment of the present invention, and FIG. 5B is a signal constellation diagram representing the signals according to this transmitter. An optical pulse P0 generated by a light source 101 is split into double pulses P1 and P2 by a double-pulse generation section (here, a PLC AMZ interferometer) 102. After the double pulses P1 and P2 are modulated by the composite modulator 201 according to the present exemplary embodiment, the optical intensities of the double pulses P1 and P2 are attenuated to a single-photon level by an optical attenuator 104, and then the double pulses P1 and P2 are sent out to a transmission line.

The composite modulator 201 has the main configuration of a Mach-Zehnder interferometer and includes an input-side Y branch 231, a Mach-Zehnder intensity modulator 232 which is placed in one of the Mach-Zehnder arms, a Mach-Zehnder intensity modulator 233 and phase modulator 234 which are placed in the other arm, and an output-side Y branch 235. Here, it is preferable that the Mach-Zehnder intensity modulators 232 and 233 be X-cut LN modulators using lithium niobate ($LiNbO_3$). The double pulses modulated by the composite modulator 201 are output to the optical attenuator 104. In addition, in the present exemplary embodiment, it is assumed that light combined at the output-side Y branch 235 is branched into two parts, one of which is output as the output light of the Y branch 235.

The Mach-Zehnder intensity modulators 232 and 233 and phase modulator 234 of the composite modulator 201 are driven by driving signals $RF_A$, $RF_B$, and $RF_C$, respectively. Hereinafter, to simplify the signal generation circuit, it is assumed that each of the driving electric signals for the respective modulators is a binary signal. Note that the modulators for constituting the composite modulator 201 are commercially available as SSB-SC modulators or FSK modulators using a LiNbO$_3$ waveguide (for example, see URL as of January 2007: http://www.socnb.com/report/pproduct/ln10.pdf).

1.2) Operation

Figure 6:
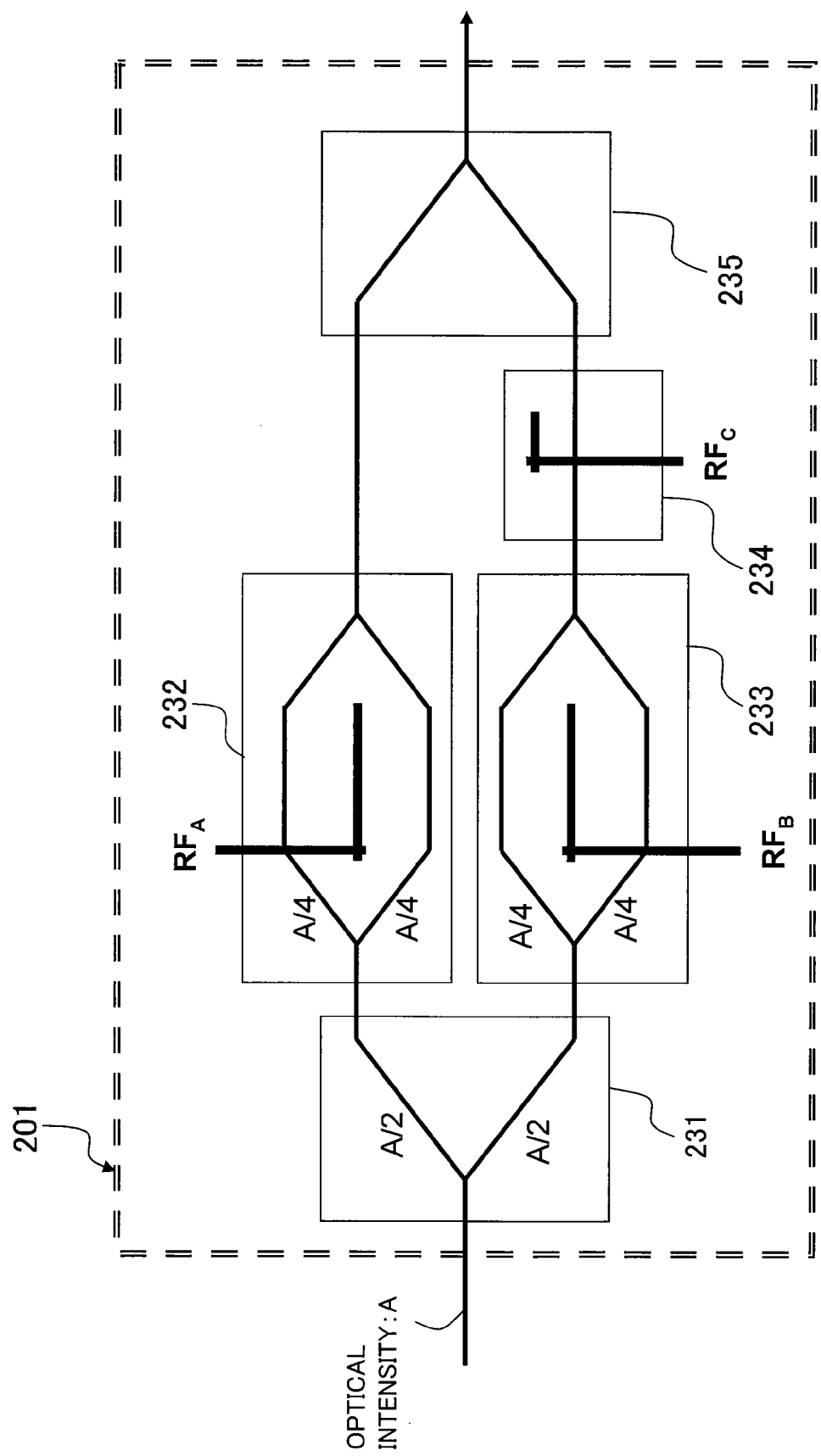
FIG. 6 is a diagram showing optical intensities at places in a composite modulator used in the first exemplary embodiment of the present invention.

FIG. 6 is a diagram showing optical intensities at places in the composite modulator used in the first exemplary embodiment of the present invention. Assuming that A is the optical intensity of light at the input point of the composite modulator 201, the optical intensity becomes A/2 after the light is branched at the input-side Y branch 231. The optical intensity further becomes A/4 at each of the paths of the Mach-Zehnder intensity modulators 232 and 233.

Figure 7:
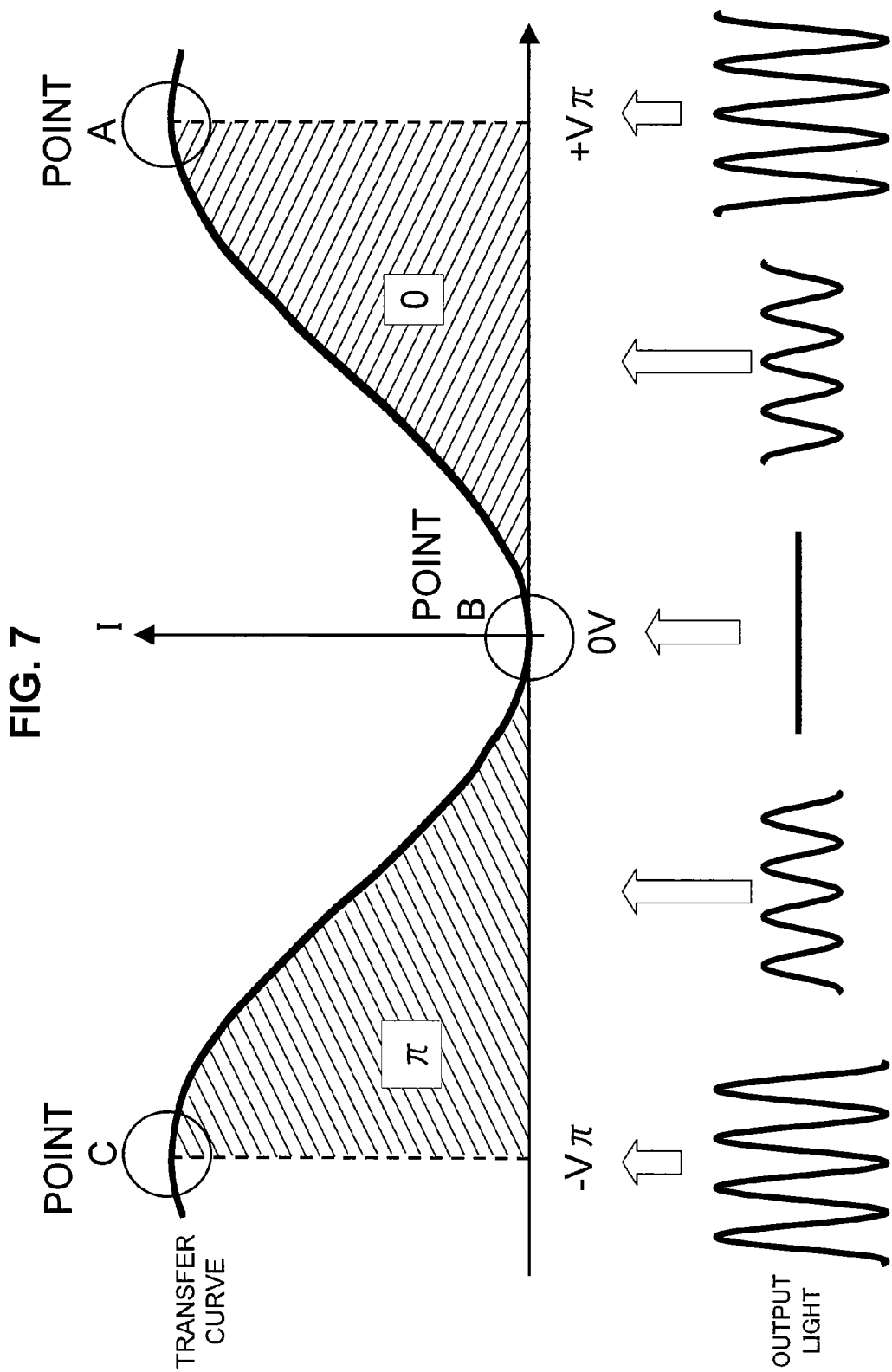
FIG. 7 is a graph conceptually showing the transfer curve of an X-cut LN intensity modulator used in the first exemplary embodiment of the present invention.

FIG. 7 is a graph conceptually showing the transfer curve of an X-cut LN intensity modulator used in the first exemplary embodiment of the present invention. In the X-cut LN intensity modulator, when voltage is applied to an electrode, the phase of the optical signal is advanced in one of the paths, and the phase of the optical signal is delayed in the other path. Accordingly, the output phase of this modulator does not change unless the driving voltage is changed so much as to come to the other side of the minimum point (point B) of the transfer curve. That is, when the driving voltage is changed within a range of 0 to +V$\pi$ [V], only the intensity of output light changes while the phase stays at 0, and when the driving voltage is changed within a range of −V$\pi$ to 0 [V], only the intensity of output light changes while the phase stays at $\pi$. The phase of output light changes by $\pi$ when the driving voltage is changed to pass through the minimum point B of the transfer curve.

In the following description, for simplicity, it is assumed that the biases to the Mach-Zehnder intensity modulators 232 and 233 are adjusted so that the output light has an intensity of 0 when the voltages of the driving signals $RF_A$ and $RF_B$ are 0 [V]. Referring to the transfer curve shown in FIG. 7, the voltage of the driving signal $RF_A$ to be applied to the Mach-Zehnder intensity modulator 232 is changed between a voltage at the point A and a voltage at the point B, and the voltage of the driving signal $RF_B$ to be applied to the Mach-Zehnder intensity modulator 233 is changed between the voltage at the point B and a voltage at the point C. Accordingly, the phases of the output light of the Mach-Zehnder intensity modulators 232 and 233 can accurately represent two values, 0 and $\pi$.

Further, it is assumed that the optical path difference between the paths is adjusted so that the output light of the composite modulator 201 has the largest intensity when the voltages of the driving signals $RF_A$ and $RF_B$ are kept at the voltage (+V$\pi$ [V]) at the point A in FIG. 7 and when the voltage of the driving signal $RF_C$ to be applied to the phase modulator 234 is 0 [V]. In addition, it is assumed that the driving voltage (V$\pi$ [V]) for causing a phase difference of $\pi$ is the same among the modulators.

Figure 8:
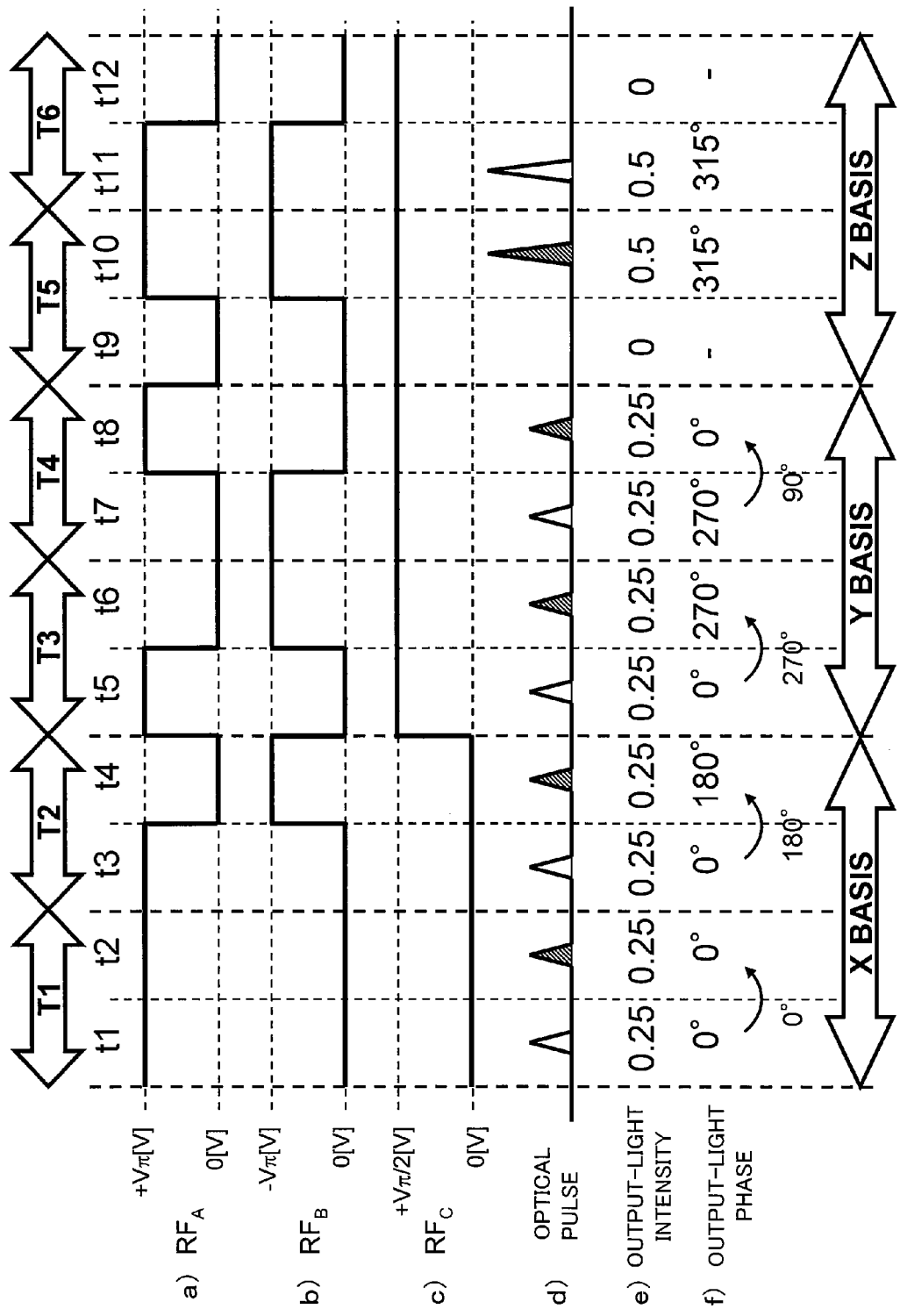
FIG. 8 is a schematic diagram showing the relationship between driving voltages and output-light intensity/phase, to describe a method for driving the composite modulator used in the first exemplary embodiment of the present invention.

FIG. 8 is a schematic diagram showing the relationship between the driving voltages and the output-light intensity/ phase, to describe a method for driving the composite modulator used in the first exemplary embodiment of the present invention. Here, to simplify the description, it is assumed that each two (t1 & t2/t3 & t4/ . . . ) of pulse time periods t1 to t12 correspond to the timing of double pulses. In FIG. 8, a) to c) show the waveforms of the driving signals $RF_A$, $RF_B$, and $RF_C$, respectively; d) schematically shows the output-light intensity; e) shows values representing the varying relative magnitudes of the output-light intensity; f) shows values representing the varying output-light phases of the double pulses. However, it is assumed that each value in e) represents the ratio of the output-light intensity to A (=1) in FIG. 6.

Referring to FIG. 8, in the pulse time period t1, since the voltages of the driving signals $RF_A$, $RF_B$, and $RF_C$ are +V$\pi$ [V], 0 [V], and 0 [V], respectively, the output light of the Mach-Zehnder intensity modulator 232 has a phase of 0 and an intensity of ½, and the output light of the Mach-Zehnder intensity modulator 233 has an intensity of 0. Since the light from these modulators is combined at the output-side Y branch 235 and the combined light is branched into two parts and then output, the output light of the output-side Y branch 235 has a phase of 0 and an intensity of ¼. Modulation in each of the pulse time periods t2, t3, t5, and t8 is similarly performed as in the above-described pulse time period t1. Accordingly, the output light at these time points also has a phase of 0 and an intensity of ¼.

In the pulse time period t4, since the voltages of the driving signals $RF_A$, $RF_B$, and $RF_C$ are 0 [V], −V$\pi$ [V], and 0 [V], respectively, the output light of the Mach-Zehnder intensity modulator 232 has an intensity of 0, and the output light of the Mach-Zehnder intensity modulator 233 has a phase of $\pi$ and an intensity of ½. Accordingly, the output light of the output-side Y branch 235 has a phase of $\pi$ and an intensity of ¼.

In each of the pulse time periods t6 and t7, since the voltages of the driving signals $RF_A$, $RF_B$, and $RF_C$ are 0 [V], −V$\pi$ [V], and +V$\pi$/2 [V], respectively, the output light of the Mach-Zehnder intensity modulator 232 has an intensity of 0, and the output light of the Mach-Zehnder intensity modulator 233 has a phase of $\pi$ and an intensity of ½. Since the output light of the Mach-Zehnder intensity modulator 233 further goes through a phase modulation corresponding to +V$\pi$/2 [V] ($RF_C$) at the phase modulator 234, the light has a phase of 3$\pi$/2 and an intensity of ½ when it enters the output-side Y branch 235. The light from these modulators is combined at the Y branch 235, whereby the output light of the output-side Y branch 235 has a phase of 3$\pi$/2 and an intensity of ¼.

In each of the pulse time periods t9 and t12, since the voltages of the driving signals $RF_A$, $RF_B$, and $RF_C$ are 0 [V], 0 [V], and +V$\pi$/2 [V], respectively, the output light of each of the Mach-Zehnder intensity modulators 232 and 233 has an intensity of 0, and the output light of the output-side Y branch 235 also has an intensity of 0.

Lastly, in each of the pulse time periods t10 and t11, since the voltages of the driving signals $RF_A$, $RF_B$, and $RF_C$ are +V$\pi$ [V], −V$\pi$ [V], and +V$\pi$/2 [V], respectively, the output light of the Mach-Zehnder intensity modulators 232 has a phase of 0 and an intensity of ½, and the output light of the Mach-Zehnder intensity modulators 233 has a phase of $\pi$ and an intensity of ½. Since the output light of the Mach-Zehnder intensity modulator 233 further goes through a phase modulation corresponding to +V$\pi$/2 [V] ($RF_C$), the light has a phase of 3$\pi$/2 and an intensity of ½ when it enters the output-side Y branch 235. The light having a phase of 0 and an intensity of ½ and the light having a phase of 3$\pi$/2 and an intensity of ½ are combined at the Y branch 235, whereby the output light of the output-side Y branch 235 has a phase of 7$\pi$/4 and an intensity of ½.

Based on the foregoing, in a time period T1 including the pulse time periods t1 and t2, since the double pulses have the same intensity (¼) and also have the same phase, this state corresponds to "0" in the X basis. In a time period T2 including the pulse time periods t3 and t4, since the intensities of the double pulses are the same (¼) but the phases are different by 180° ($\pi$), this state corresponds to "1" in the X basis.

In a time period T3 including the pulse time periods t5 and t6, since the intensities of the double pulses are the same (¼) but the phases are different by 270° ($3\pi/2$), this state corresponds to "1" in the Y basis. In a time period T4 including the pulse time periods t7 and t8, since the intensities of the double pulses are the same (¼) but the phases are different by 90° ($\pi/2$), this state corresponds to "0" in the Y basis.

In each of a time period T5 including the pulse time periods t9 and t10 and a time period T6 including the pulse time periods t11 and t12, one of the double pulses is extinguished and the other pulse has twice as strong intensity (½) as the intensity made when the X/Y basis is selected. Accordingly, the states in the time periods T5 and T6 correspond to "0" and "1" in the Z basis. Hence, modulation with three values (0, ¼, ½) in intensity and four values (a=0, b=$\pi$, c=$3\pi/2$, d=$\pi/2$) in phase as shown in FIG. 4 can be accomplished.

As described above, using the three driving signals $RF_A$, $RF_B$, and $RF_C$, it is possible to generate "0" and "1" in each of the X, Y, and Z bases. Accordingly, the BB84 protocol can be implemented by selecting any two of the three X, Y, and Z bases. In other words, if the modulations in the time periods T1, T2, T3, and T4 are repeated at random, four-state phase coding, which corresponds with the receiver according to the scheme A, can be accomplished.

Figure 1B:
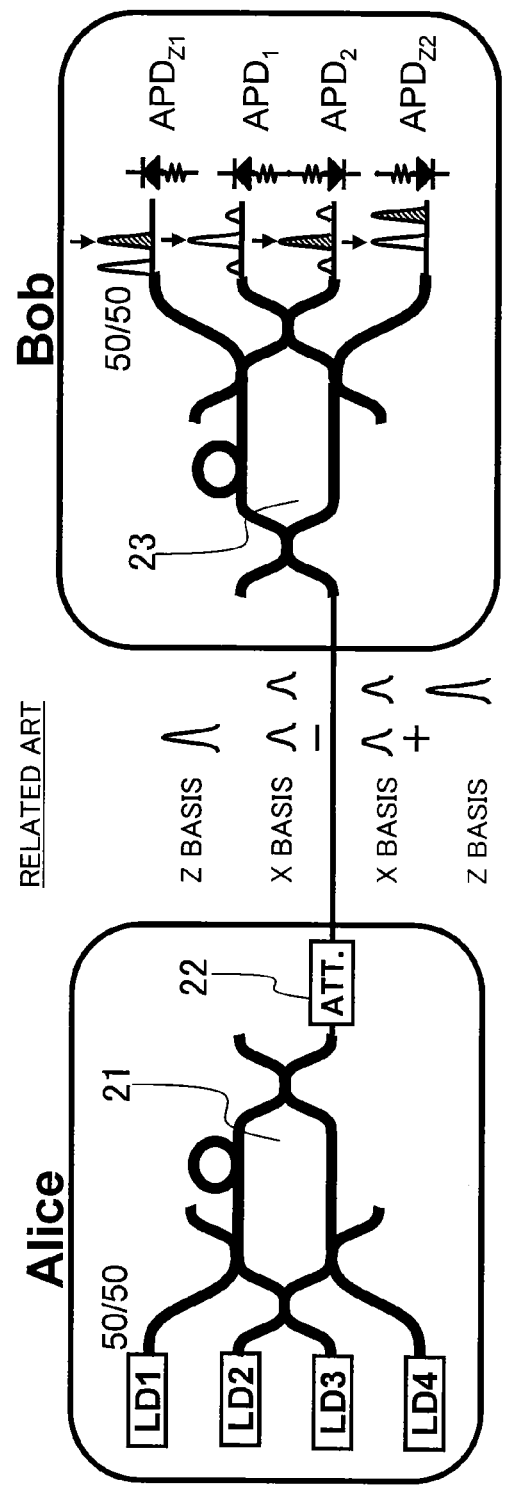
FIG. 1B is a block diagram schematically showing a one-way QKD system disclosed in Nambu, Y., Yoshino, K., and Tomita, A., "Quantum key distribution systems without optical switching using planar lightwave circuit," The 8th International Conference on Quantum Communication, Measurement and Computing, pp. 2-31.
Figure 3B:
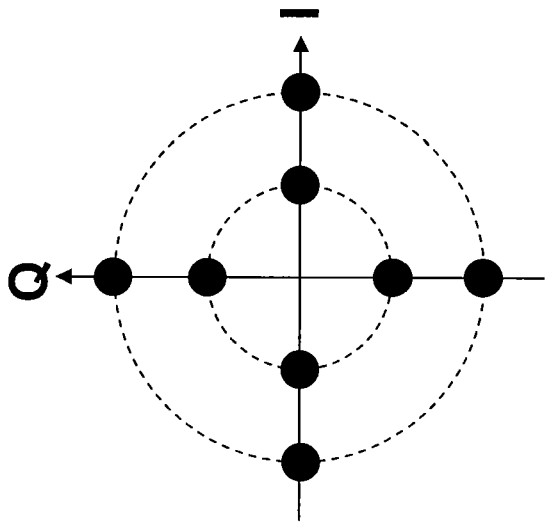
FIG. 3B is a signal constellation diagram showing the signal points according to the ASK-QPSK transmitter as shown in FIG. 3A.
Figure 3A:
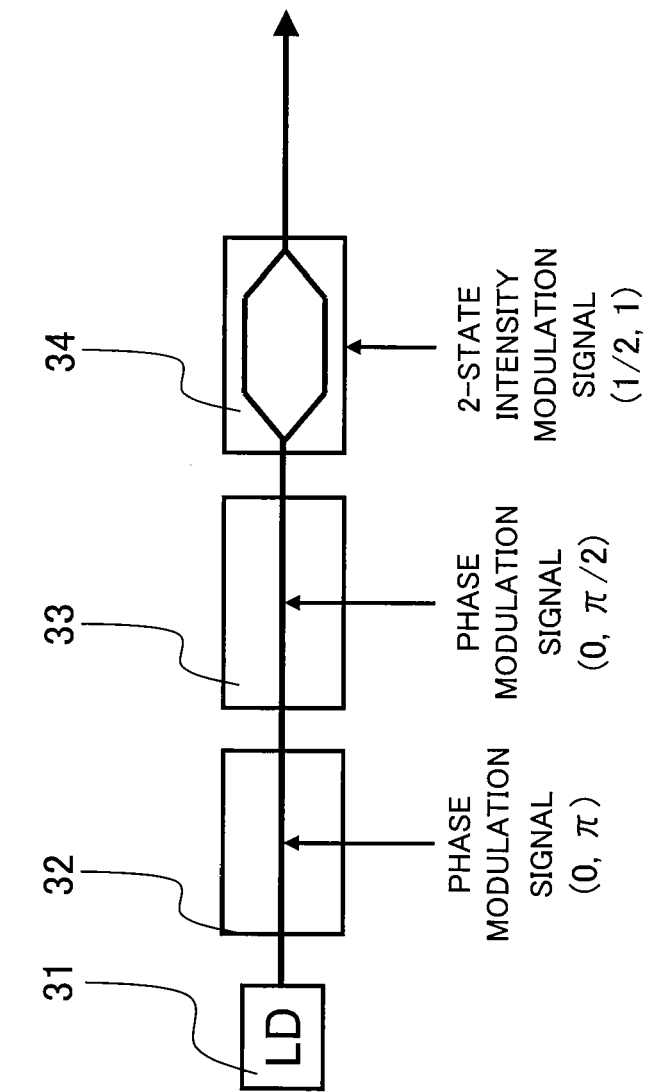
FIG. 3A is a diagram showing the configuration of an ASK-QPSK transmitter described in Hayase, S., Kikuchi, N., Sekine, K., and Sasaki, S., "Proposal of 8-state per Symbol (Binary ASK and QPSK) 30-Gbit/s Optical Modulation/Demodulation Scheme," ECOC 2003, Th.2.6.4.

Moreover, when the modulations in the time periods T1, T2, T5, and T6 are repeated at random and the phase difference between the two paths of the Mach-Zehnder interferometer of the two-input, four-output PLC AMZ 23 in FIG. 1B is set at 0 or $\pi$, two-state phase and two-state time coding, which corresponds with the receiver according to the scheme B, can be accomplished.

Furthermore, the two-state phase and two-state time coding, which corresponds with the receiver according to the scheme B, can also be accomplished when the modulations in the time periods T3, T4, T5, and T6 are repeated at random and the phase difference between the two paths of the Mach-Zehnder interferometer of the two-input, four-output PLC AMZ 23 in FIG. 1B is set at $\pi/2$ or $3\lambda/2$. In this case, for the driving signal $RF_C$, a high-speed signal is not required, and it is sufficient to continually bias at $+V\pi/2$ [V]. Accordingly, the power consumed by a modulator driver can be further reduced.

Note that in the present exemplary embodiment, the voltage of the driving signal $RF_C$ may be any one of 0 [V] and $+V\pi/2$ [V] in the pulse time periods t1 to t3, t5, t8, t9, and t12 because the voltage of the driving signal $RF_B$ is 0 [V] and the output light of the Mach-Zehnder intensity modulator 233 has an intensity of 0. When plotting on an IQ plane the output-light states that can be prepared in the present exemplary embodiment, they are as shown in FIG. 5B.

1.3) Effects

As described above, according to the first exemplary embodiment of the present invention, it is possible to configure a transmitter that can communicate with both of the receivers according to the quantum cryptographic schemes A and B. Moreover, it is possible to prevent a reduction in security that could occur due to the wavelength deviation among light sources, which is a problem when the scheme B is used. Additionally, the optical transmitter according to the present exemplary embodiment also has the advantage of high versatility, space saving, and lower power consumption.

Although a PLC Mach-Zehnder interferometer is used as means for temporally separating and combining optical pulses in the present exemplary embodiment, the present invention is not limited to this embodiment. A similar transmitter also can be configured by using an interferometer of another type such as Michelson type.

Moreover, although each of the driving signals for driving the two Mach-Zehnder intensity modulators 232 and 233 is changed in voltage with amplitude of V [V], the amplitude of the driving voltage applied to an intensity modulator is not limited to V$\pi$ [V]. For example, assuming that Vmin [V] is a driving voltage required to obtain the minimum point B of the transfer curve in FIG. 7, and Va [V] is the amplitude of the driving voltage, similar states can be obtained if one of the intensity modulators is driven between Vmin [V] and (Vmin+Va) [V] and the other intensity modulator is driven between Vmin [V] and (Vmin−Va) [V].

2. Second Exemplary Embodiment

A composite modulator according to a second exemplary embodiment of the present invention includes a Mach-Zehnder intensity modulator placed in one of the paths (arms) of a Mach-Zehnder interferometer, and two phase modulators placed in the other path (the other arm). That is, in FIG. 4, the first optical modulator 132 is a Mach-Zehnder intensity modulator, and the second optical modulator 133 and third optical modulator 134 are phase modulators.

2.1) Configuration

FIG. 9A is a block diagram showing the schematic configuration of an optical transmitter according to the second exemplary embodiment of the present invention, and FIG. 9B is a signal constellation diagram showing the signal points according to this transmitter. The second exemplary embodiment is different from the first exemplary embodiment shown in FIG. 5A only in the configuration of the composite modulator 301, and the other circuitry is the same. Accordingly, the same circuit elements as in FIG. 5A are denoted by the same reference numerals as in FIG. 5A, and the description thereof will be omitted.

The composite modulator 301 has the main configuration of a Mach-Zehnder interferometer and includes an input-side Y branch 331, a Mach-Zehnder intensity modulator 332 placed in one of the Mach-Zehnder arms, phase modulators 333 and 334 placed in the other arm, and an output-side Y branch 335. Here, it is preferable that the Mach-Zehnder intensity modulator 332 be an X-cut LN modulator using lithium niobate (LiNbO$_3$). Double pulses modulated by the composite modulator 301 are output to an optical attenuator 104. Additionally, in the present exemplary embodiment, it is assumed that light combined at the output-side Y branch 335 is branched into two parts, one of which is output as the output light of the Y branch 335.

The Mach-Zehnder intensity modulator 332 and phase modulators 333 and 334 of the composite modulator 301 are driven by using driving signals $RF_A$, $RF_B$, and $RF_C$, respectively. It is assumed that the Mach-Zehnder intensity modulator 332 has the transfer curve shown in FIG. 7.

2.2) Operation

In the following description, for simplicity, it is assumed that the bias to the Mach-Zehnder intensity modulator 332 is adjusted so that the output light has an intensity of 0 when the application voltage of the driving signal $RF_A$ is 0 [V]. Referring to the transfer curve in FIG. 7, the voltage of the driving signal $RF_A$ to be applied to the Mach-Zehnder intensity modulator 332 is changed between a voltage at the point A and a voltage at the point B.

Incidentally, it is assumed that the optical path difference between the paths is adjusted so that the output light of the composite modulator 301 has the largest intensity when the voltage of the driving signal $RF_A$ is kept at the voltage (+V$\pi$ [V]) at the point A in FIG. 7 and the voltages of the driving signals $RF_B$ and $RF_C$ to be applied to the phase modulators 333 and 334 are 0 [V]. In addition, it is assumed that a driving voltage (V$\pi$ [V]) for causing a phase difference of $\pi$ is the same among the modulators.

FIG. 10 is a schematic diagram showing the relationship between the driving voltages and the output-light intensity/phase, to describe a method for driving the composite modulator used in the second exemplary embodiment of the present invention. Here, to simplify the description, it is assumed that each two (t1 & t2/t3 & t4/ . . . ) of pulse time periods t1 to t12 correspond to the timing of double pulses. In FIG. 10, a) to c) show the waveforms of the driving signals $RF_A$, $RF_B$, and $RF_C$, respectively; d) schematically shows the output-light intensity; e) shows values representing the varying relative magnitudes of the output-light intensity; and f) shows values representing the varying output-light phases of the double pulses. However, it is assumed that each value in e) represents the ratio of the output-light intensity to the intensity (=1) of an optical pulse entering the composite modulator 301.

Referring to FIG. 10, in the pulse time period t1, since the voltages of the driving signals $RF_A$, $RF_B$, and $RF_C$ are set at 0 [V], the output light of the Mach-Zehnder intensity modulator 332 has an intensity of 0, and the output light of the phase modulator 334 has a phase of 0 and an intensity of ½. When the light from these modulators is combined at the output-side Y branch 335, the output light of the Y branch 335 has a phase of 0 and an intensity of ¼. In each of the pulse time periods t2, t3, t5, and t7 as well, since modulation is performed similarly as in the pulse time period t1, the output light having a phase of 0 and an intensity of ¼ is obtained.

Next, in the pulse time period t4, the voltages of the driving signals $RF_A$, $RF_B$, and $RF_C$ are 0 [V], +V$\pi$ [V], and 0 [V], respectively. Accordingly, the output light of the Mach-Zehnder intensity modulator 332 has an intensity of 0, and the output light of the phase modulator 334 has a phase of $\pi$ and an intensity of ½. Accordingly, when the light from these modulators is combined, the output light of the output-side Y branch 335 has a phase of $\pi$ and an intensity of ¼.

In the pulse time period t6, the voltages of the driving signals $RF_A$, $RF_B$, and $RF_C$ are 0 [V], +V$\pi$ [V], and +V$\pi$/2 [V], respectively. Accordingly, the output light of the Mach-Zehnder intensity modulator 332 has an intensity of 0, and the output light of the phase modulator 334 has a phase of 3$\pi$/2 and an intensity of ½. Accordingly, when the light from these modulators is combined, the output light of the output-side Y branch 335 has a phase of 3$\pi$/2 and an intensity of ¼.

In the pulse time period t8, the voltages of the driving signals $RF_A$, $RF_B$, and $RF_C$ are 0 V, 0 V, and +V$\pi$/2 V, respectively. Accordingly, the output light of the Mach-Zehnder intensity modulator 332 has an intensity of 0, and the output light of the phase modulator 334 has a phase of $\pi$/2 and an intensity of ½. Accordingly, when the light from these modulators is combined, the output light of the output-side Y branch 335 has a phase of $\pi$/2 and an intensity of ¼.

In each of the pulse time periods t9 and t12, the voltages of the driving signals $RF_A$, $RF_B$, and $RF_C$ are +V[V], +V$\pi$ [V], and 0 [V], respectively. Accordingly, the output light of the Mach-Zehnder intensity modulator 332 has a phase of 0 and an intensity of ½, and the output light of the phase modulator 334 has a phase of $\pi$ and an intensity of ½. Accordingly, when the light from these modulators is combined, cancellation occurs and the intensity of the output light of the output-side Y branch 335 becomes zero.

Lastly, in each of the pulse time periods t10 and t11, the voltages of the driving signals $RF_A$, $RF_B$, and $RF_C$ are +V$\pi$ [V], +V [V], and +V$\pi$/2 [V], respectively. Accordingly, the output light of the Mach-Zehnder intensity modulator 332 has a phase of 0 and an intensity of ½, and the output light of the phase modulator 334 has a phase of 3$\lambda$/2 and an intensity of ½. Accordingly, when the light having a phase of 0 and an intensity of ½ and the light having a phase of 3$\pi$/2 and an intensity of ½ are combined, the output light of the output-side Y branch 335 has a phase of 7$\pi$/4 and an intensity of ½.

Based on the foregoing, in a time period T1 including pulse time periods t1 and t2, since the double pulses have the same intensity and also have the same phase, this state corresponds to "0" in the X basis. In a time period T2 including the pulse time periods t3 and t4, since the intensities of the double pulses are the same but the phases are different by 180° ($\pi$), this state corresponds to "1" in the X basis.

In a time period T3 including the pulse time periods t5 and t6, since the intensities of the double pulses are the same but the phases are different by 270° (3$\pi$/2), this state corresponds to "1" in the Y basis. In a time period T4 including the pulse time periods t7 and t8, since the intensities of the double pulses are the same but the phases are different by 90° ($\pi$/2), this state corresponds to "0" in the Y basis.

In each of a time period T5 including the pulse time periods t9 and t10 and a time period T6 including the pulse time periods t11 and t12, one of the double pulses is extinguished and the other pulse has twice as strong intensity as the intensity made when the X/Y basis is selected.

Accordingly, the states in the time periods T5 and T6 correspond to "0" and "1" in the Z basis. Hence, modulation with three values (0, ¼, ½) in intensity and four values (a=0, b=$\pi$, c=3$\pi$/2, d=$\pi$/2) in phase as shown in FIG. 4 can be accomplished.

As described above, using the three driving signals $RF_A$, $RF_B$, and $RF_C$, it is possible to generate "0" and "1" in each of the X, Y and Z bases. Accordingly, the BB84 protocol can be implemented by selecting any two of the three X, Y and Z bases. In other words, if the modulations in the time periods T1, T2, T3, and T4 are repeated at random, four-state phase coding, which corresponds with the receiver according to the scheme A, can be accomplished. In this case, for the driving signal $RF_A$, a high-speed signal is not required, and it is sufficient only to continually bias at 0 [V]. Accordingly, the power consumed by a modulator driver can be reduced.

Moreover, when the modulations in the time periods T1, T2, T5, and T6 are repeated at random and the phase difference between the two paths of the Mach-Zehnder interferometer of the two-input, four-output PLC AMZ 23 in FIG. 1B is set at 0 or $\pi$, two-state phase+two-state time coding, which corresponds with the receiver according to the scheme B, can be accomplished.

Furthermore, the two-state phase+two-state time coding, which corresponds with the receiver according to the scheme B, can also be accomplished when the modulations in the time periods T3, T4, T5, and T6 are repeated at random and the phase difference between the two paths of the Mach-Zehnder interferometer of the two-input, four-output PLC AMZ 23 in FIG. 1B is set at $\pi$/2 or 3$\pi$/2. When plotting on an IQ plane the output-light states that can be prepared in the present exemplary embodiment, they are as shown in FIG. 9B.

2.3) Effects

The second exemplary embodiment of the present invention can also achieve effects similar to those of the first exemplary embodiment. That is, according to the second exemplary embodiment as well, it is possible to configure a transmitter that can communicate with both of the receivers according to the quantum cryptographic schemes A and B. Moreover, it is possible to prevent a reduction in security that could occur due to the wavelength deviation among light sources, which is a problem when the scheme B is used. Additionally, the optical transmitter according to the second exemplary embodiment also has the advantage of high versatility, space saving, and lower power consumption.

Although a PLC Mach-Zehnder interferometer is used as means for temporally separating and combining optical pulses in the second exemplary embodiment, the present invention is not limited to this embodiment. A similar transmitter can also be configured by using an interferometer of another type such as a Michelson type.

Moreover, although the driving signal for driving the Mach-Zehnder intensity modulator 332 is changed in voltage with amplitude of $V\pi$ [V], the amplitude of the driving voltage is not limited to $V\pi$ [V]. For example, assuming that Vmin [V] is a driving voltage required to obtain the minimum point B of the transfer curve in FIG. 7, and Va [V] is the amplitude of the driving voltage, similar states can be obtained if the intensity modulator is driven between Vmin [V] and (Vmin+Va) [V].

Incidentally, it is sufficient for the phase modulator 333 to perform the operation to change the output-light phase between 0 and $\pi$ while producing constant intensity. Therefore, equivalent modulation can be performed by using the Mach-Zehnder intensity modulator 233 of the first exemplary embodiment shown in FIG. 5 configured to be driven between $-V\pi$ and $+V\pi$, as can be seen from the transfer curve in FIG. 7.

3. Third Exemplary Embodiment

A composite modulator according to a third exemplary embodiment of the present invention includes a phase modulator placed in one of the paths (arms) of a Mach-Zehnder interferometer, and two phase modulators placed in the other path (the other arm). That is, in FIG. 4, the first optical modulator 132, second optical modulator 133, and third optical modulator 134 are all phase modulators.

3.1) Configuration

Figure 11A:
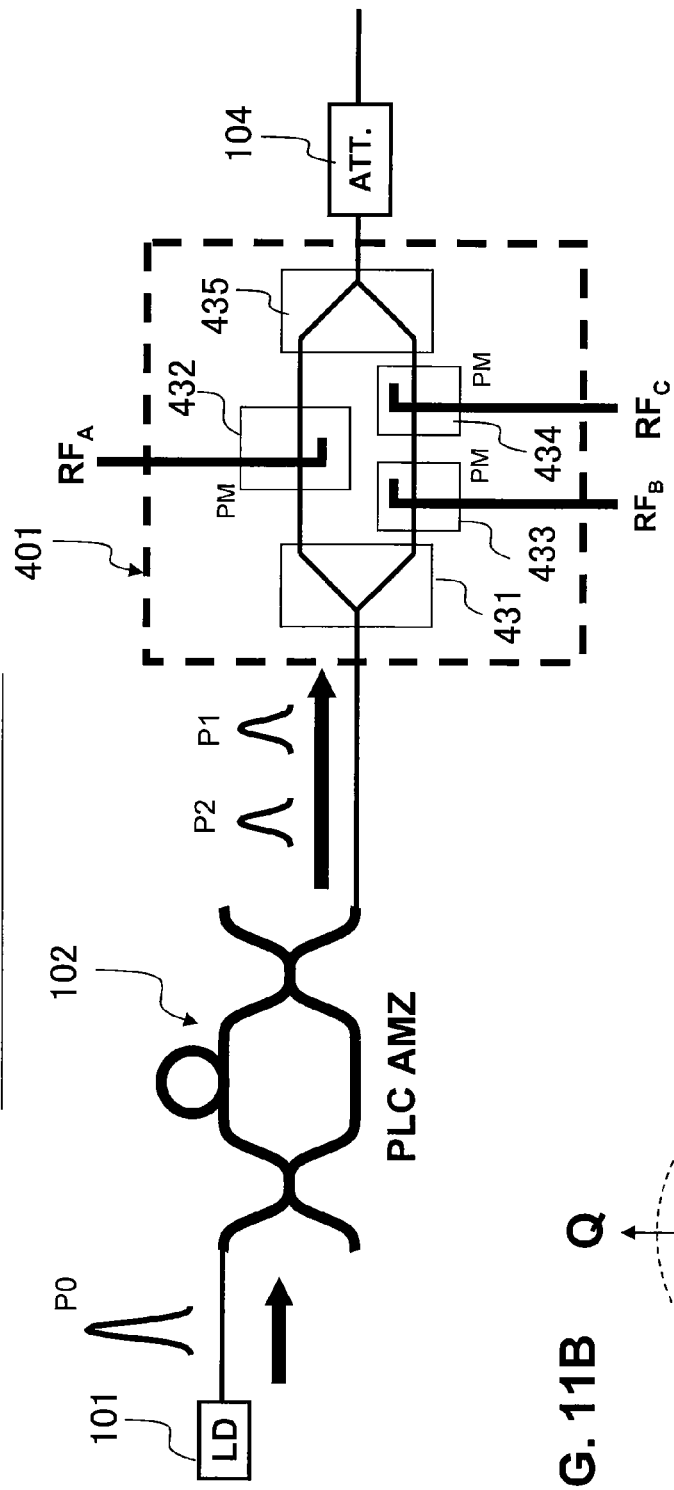
FIG. 11A is a block diagram showing the schematic configuration of an optical transmitter according to a third exemplary embodiment of the present invention.
Figure 11B:
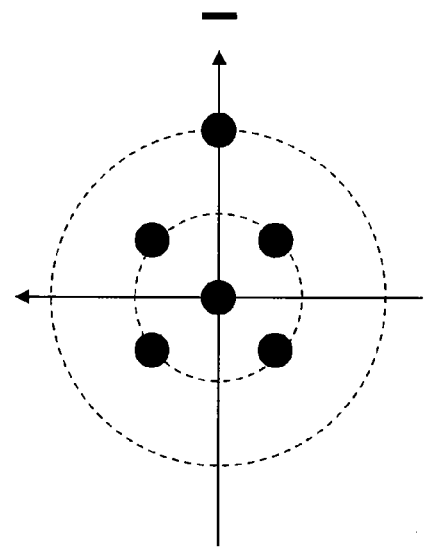
FIG. 11B is a signal constellation diagram representing the signals according to the transmitter shown in FIG. 11A.

FIG. 11A is a block diagram showing the schematic configuration of an optical transmitter according to the third exemplary embodiment of the present invention, and FIG. 11B is a signal constellation diagram showing the signal points according to this transmitter. The third exemplary embodiment is different from the first exemplary embodiment shown in FIG. 5A only in the configuration of a composite modulator 401, and the other circuitry is the same. Accordingly, the same circuit elements as in FIG. 5A are denoted by the same reference numerals as in FIG. 5A, and the description thereof will be omitted.

The composite modulator 401 has the main configuration of a Mach-Zehnder interferometer and includes an input-side Y branch 431, a phase modulator 432 placed in one of the Mach-Zehnder arms, phase modulators 433 and 434 placed in the other arm, and an output-side Y branch 435. Double pulses modulated by the composite modulator 401 are output to an optical attenuator 104. The phase modulators 432, 433 and 434 of the composite modulator 401 are driven by using driving signals $RF_A$, $RF_B$, and $RF_C$, respectively. Additionally, in the present exemplary embodiment, it is assumed that light combined at the output-side Y branch 435 is branched into two parts, one of which is output as the output light of the Y branch 435.

3.2) Operation

In the following description, for simplicity, it is assumed that the optical path difference between the paths is adjusted so that the output light of the phase modulator 432 has a phase of 0 when the application voltage of the driving signal $RF_A$ is 0 [V], that the output light of the phase modulator 433 has a phase of 0 when the application voltage of the driving signal $RF_B$ is 0 [V], and that the output light of the composite modulator 401 has the largest intensity when the voltages of the driving signals $RF_A$, $RF_B$, and $RF_C$ are set at 0 [V]. In addition, it is assumed that a driving voltage ($V\pi$ [V]) for causing a phase difference of $\pi$ is the same among the modulators.

Figure 12:
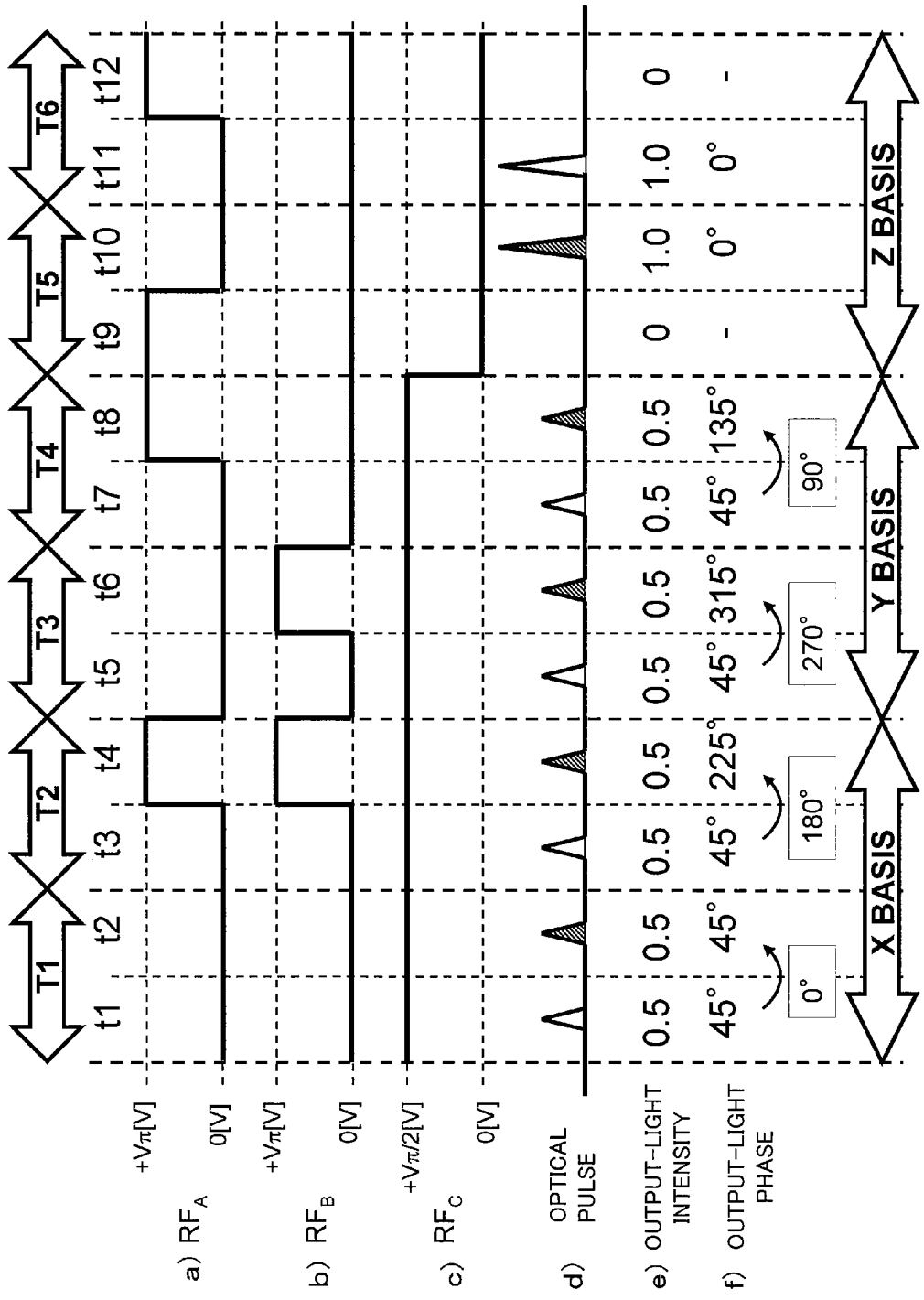
FIG. 12 is a schematic diagram showing the relationship between driving voltages and output-light intensity/phase, to describe a method for driving a composite modulator used in the third exemplary embodiment of the present invention.

FIG. 12 is a schematic diagram showing the relationship between the driving voltages and the output-light intensity/phase, to describe a method for driving the composite modulator used in the third exemplary embodiment of the present invention. Here, to simplify the description, it is assumed that each two (t1 & t2/t3 & t4/ ... ) of pulse time periods t1 to t12 correspond to the timing of double pulses. In FIG. 12, a) to c) show the waveforms of the driving signals $RF_A$, $RF_B$, and $RF_C$, respectively; d) schematically shows the output-light intensity; e) shows values representing the varying relative magnitudes of the output-light intensity; f) shows values representing the varying output-light phases of the double pulses. However, it is assumed that each value in e) represents the ratio of the output-light intensity to the intensity (=1) of an optical pulse entering the composite modulator 401 in FIG. 11A.

Referring to FIG. 12, in the pulse time period t1, since the voltages of the driving signals $RF_A$ and $RF_B$ are set at 0 [V] and the voltage of the driving signal $RF_C$ is set at $+V\pi/2$ [V], the output light of the phase modulator 432 has a phase of 0 and an intensity of ½, and the output light of the phase modulator 434 has a phase of $\pi/2$ and an intensity of ½. When the light from these modulators is combined, the output light of the output-side Y branch 435 has a phase of $\pi/4$ and an intensity of ½. In each of the pulse time periods t2, t3, t5, and t7 as well, since modulation is similarly performed as in the pulse time period t1, output light having a phase of $\pi/4$ and an intensity of ½ is obtained.

Next, in the pulse time period t4, the voltages of the driving signals $RF_A$, $RF_B$, and $RF_C$ are $+V\pi$ [V], $+V\pi$ [V], and $+V\pi/2$ [V], respectively. Accordingly, the output light of the phase modulator 432 has a phase of $\pi$ and an intensity of ½, and the output light of the phase modulator 434 has a phase of $3\pi/2$ and an intensity of ½. Accordingly, when the light from these modulators is combined, the output light of the output-side Y branch 435 has a phase of $5\pi/4$ and an intensity of ½.

In the pulse time period t6, the voltages of the driving signals $RF_A$, $RF_B$, and $RF_C$ are 0 [V], $+V\pi$V], and $+V\pi/2$ [V], respectively. Accordingly, the output light of the phase modulator 432 has a phase of 0 and an intensity of ½, and the output light of the phase modulator 434 has a phase of $3\pi/2$ and an intensity of ½. When the light from these modulators is combined, the output light of the output-side Y branch 435 has a phase of $7\pi/4$ and an intensity of ½.

In the pulse time period t8, the voltages of the driving signals $RF_A$, $RF_B$ and $RF_C$ are $+V\pi$ [V], 0 [V], and $+V\pi/2$ [V], respectively. Accordingly, the output light of the phase modulator 432 has a phase of $\pi$ and an intensity of ½, and the output light of the phase modulator 434 has a phase of $\pi/2$ and an intensity of ½. When the light from these modulators is combined, the output light of the output-side Y branch 435 has a phase of $3\pi/4$ and an intensity of ½.

In each of the pulse time periods t9 and t12, the voltages of the driving signals $RF_A$, $RF_B$, and $RF_C$ are $+V\pi$ [V], 0 [V], and 0 [V], respectively. Accordingly, the output light of the phase modulator 432 has a phase of $\pi$ and an intensity of ½, and the output light of the phase modulator 434 has a phase of 0 and an intensity of ½. When the light from these modulators is combined, the intensity of the output light of the output-side Y branch 435 becomes zero.

Lastly, in each of the pulse time periods t10 and t11, the voltages of the driving signals $RF_A$, $RF_B$, and $RF_C$ are each 0 [V]. Accordingly, the output light of the phase modulator 432 has a phase of 0 and an intensity of ½, and the output light of the phase modulator 434 has a phase of 0 and an intensity of ½. When the light from these modulators is combined, the output light of the output-side Y branch 435 has a phase of 0 and an intensity of 1.

Based on the foregoing, in a time period T1 including the pulse time periods t1 and t2, since the double pulses have the same intensity and also have the same phase, this state corresponds to "0" in the X basis. In a time period T2 including the pulse time periods t3 and t4, since the intensities of the double pulses are the same but the phases are different by 180° ($\pi$), this state corresponds to "1" in the X basis.

In a time period T3 including the pulse time periods t5 and t6, since the intensities of the double pulses are the same but the phases are different by 270° ($3\pi/2$), this state corresponds to "1" in the Y basis. In a time period T4 including the pulse time periods t7 and t8, since the intensities of the double pulses are the same but the phases are different by 90° ($\pi/2$), this state corresponds to "0" in the Y basis.

In each of a time period T5 including the pulse time periods t9 and t10 and a time period T6 including the pulse time periods t11 and t12, one of the double pulses is extinguished and the other pulse has twice as strong intensity as the intensity made when the X/Y basis is selected. Accordingly, the states in the time periods T5 and T6 correspond to "0" and "1" in the Z basis. Hence, modulation with three values (0, ½, 1) in intensity and four values (a=$\pi/4$, b=$5\pi/4$, c=$7\pi/4$, d=$3\pi/4$) in phase as shown in FIG. 4 can be accomplished.

As described above, using the three driving signals $RF_A$, $RF_B$, and $RF_C$, it is possible to generate "0" and "1" in each of the X, Y and Z bases. Accordingly, the BB84 protocol can be implemented by selecting any two of the three X, Y and Z bases. In other words, if the modulations in the time periods T1, T2, T3, and T4 are repeated at random, four-state phase coding, which correspond with the receiver according to the scheme A, can be accomplished. In this case, for the driving signal $RF_C$, a high-speed signal is not required, and it is sufficient only to continually bias at $+V\pi/2$ [V].

Moreover, when the modulations in the time periods T1, T2, T5, and T6 are repeated at random and the phase difference between the two paths of the Mach-Zehnder interferometer of the two-input, four-output PLC AMZ 23 in FIG. 1B is set at 0 or $\pi$, two-state phase+two-state time coding, which corresponds with the receiver according to the scheme B, can be accomplished.

Furthermore, the two-state phase+two-state time coding, which corresponds with the receiver according to the scheme B, can also be accomplished when the modulations in the time periods T3, T4, T5, and T6 are repeated at random and the phase difference between the two paths of the Mach-Zehnder interferometer of the two-input, four-output PLC AMZ 23 in FIG. 1B is set at $\pi/2$ or $3\pi/2$. When plotting on an IQ plane the output-light states that can be prepared in the present exemplary embodiment, they are as shown in FIG. 11B.

3.3) Effects

The third exemplary embodiment of the present invention can also achieve effects similar to those of the first exemplary embodiment. That is, according to the third exemplary embodiment as well, it is possible to configure a transmitter that can communicate with both of the receivers according to the quantum cryptographic schemes A and B. Moreover, it is possible to prevent a reduction in security that could occur due to the wavelength deviation among light sources, which is a problem when the scheme B is used. Additionally, the optical transmitter according to the third exemplary embodiment also has the advantage of high versatility, space saving, and lower power consumption.

Although a PLC Mach-Zehnder interferometer is used as means for temporally separating and combining optical pulses in the third exemplary embodiment, the present invention is not limited to this embodiment. A similar transmitter also can be configured by using an interferometer of another type such as a Michelson type.

Incidentally, regarding the phase modulator 433, it is sufficient that the phase of the output light can be changed between 0 and $\pi$, with the intensity thereof being unchanged. Therefore, it is also possible to replace the phase modulator 433 with a Mach-Zehnder intensity modulator as shown in the following modification example.

3.4) Modified Example

Figure 13:
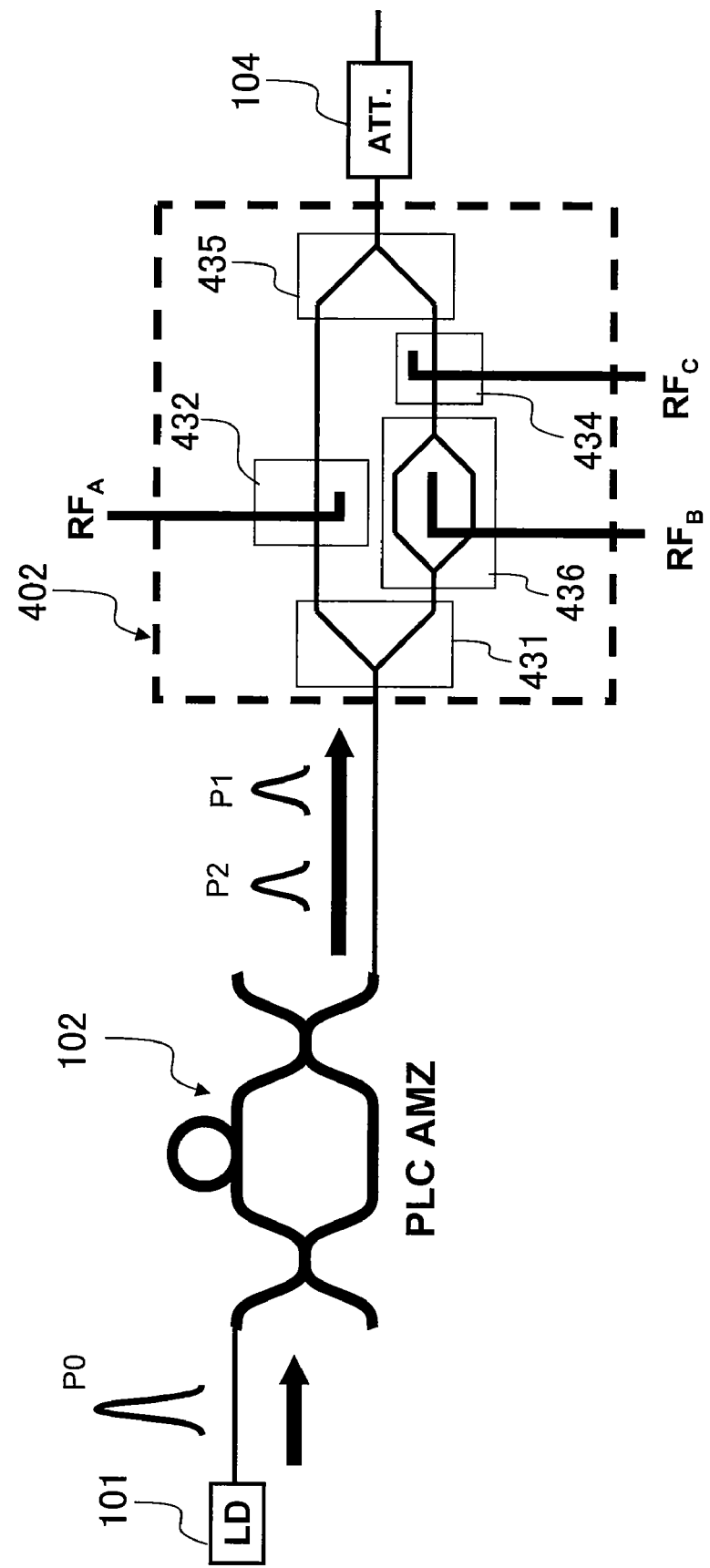
FIG. 13 is a block diagram showing the schematic configuration of an optical transmitter according to a modification example of the third exemplary embodiment of the present invention.

FIG. 13 is a block diagram showing the schematic configuration of an optical transmitter according to a modified example of the third exemplary embodiment of the present invention. This modification example is different from the third exemplary embodiment shown in FIG. 11A only in that the second phase modulator of the composite modulator is replaced by a Mach-Zehnder intensity modulator, and the other circuitry is the same. Accordingly, the same circuit elements as in FIG. 11A are denoted by the same reference numerals as in FIG. 11A, and the description thereof will be omitted.

A composite modulator 402 has the main configuration of a Mach-Zehnder interferometer and includes an input-side Y branch 431, a phase modulator 432 placed in one of the Mach-Zehnder arms, a Mach-Zehnder intensity modulator 436 and phase modulator 434 placed in the other arm, and an output-side Y branch 435. Double pulses modulated by the composite modulator 402 are output to an optical attenuator 104. The phase modulator 432, Mach-Zehnder intensity modulator 436, and phase modulator 434 of the composite modulator 402 are driven by using driving signals $RF_A$, $RF_B$, and $RF_C$, respectively.

Regarding the Mach-Zehnder intensity modulator 436, it is sufficient that the phase of the output light can be changed between 0 and $\pi$, with the intensity thereof being unchanged, as in the case of the phase modulator 433 shown FIG. 11A. Accordingly, equivalent modulation can be performed by changing the voltage of the driving signal $RF_B$ between $-V\pi$ [V] and $+V\pi$ [V].

4. Aspects of the Present Invention

An optical transmitter according to the present invention includes a light source which generates an optical pulse, a double-pulse generator which generates temporally divided double pulses from the optical pulse, and a composite optical modulator. The composite optical modulator includes a branching section which branches each of the double pulses into first and second paths, a first optical modulator placed in the first path, second and third optical modulators placed in series in the second path, and a combining section which combines the double pulses having traveled through the first path with the double pulses having traveled through the second path to generate output double pulses. The first and second optical modulators each perform any one of relative intensity modulation and relative phase modulation on the passing double pulses. The third optical modulator performs relative phase modulation on the passing double pulses. Thus, the quantum states of the X, Y and Z bases, for example, can be realized by using three modulators.

According to the first exemplary embodiment of the present invention, the modulation phase at the third optical modulator is changed between 0° and 90°. Each of the first and second optical modulators is a Mach-Zehnder intensity modulator having a predetermined transfer curve. The operation of the first optical modulator is changed between the minimum point of the transfer curve and a first operation point of the transfer curve, and the operation of the second optical modulator is changed between the minimum point of the transfer curve and a second operation point of the transfer curve, wherein the first and second operation points are symmetrical with respect to the minimum point of the transfer curve.

According to the second exemplary embodiment of the present invention, the modulation phase at the third optical modulator is changed between 0° and 90°. The first optical modulator is a Mach-Zehnder intensity modulator having a predetermined transfer curve, and the second optical modulator is an optical phase modulator. The operation of the first optical modulator is changed between the minimum and maximum points of the transfer curve, and the modulation phase at the second optical modulator is changed between 0° and 180°.

According to the third exemplary embodiment of the present invention, the modulation phase at the third optical modulator is changed between 0° and 90°. Each of the first and second optical modulators is an optical phase modulator at which the modulation phase is changed between 0° and 180°.

According to the present invention, when the scheme B shown in FIG. 1B is used, it is possible to prevent a reduction in security that could occur due to the wavelength deviation among four light sources. This is because the quantum states of the X, Y and Z bases, for example, are generated by using optical pulses from a signal light source and therefore the wavelength deviation attributable to individual differences among the light sources does not occur.

Moreover, when a transmitter of high versatility is configured, it is possible to achieve space saving and power saving. This is because the number of required modulators can be reduced by one in comparison with a case where it is attempted to generate, by using the transmitter configuration according to the scheme A shown in FIG. 1A, the same quantum states of the X, Y and Z bases that are generated by using the scheme B shown in FIG. 1B.

Note that although the BB84 protocol, which is used as a quantum key distribution technique, has been shown in the above-described exemplary embodiments as an example, the present invention is not limited to this protocol. For example, the present invention can also be applied to a 6-state protocol.

The present invention is applicable to general optical modulators of a type of performing phase modulation on optical pulses. For example, the present invention can be applied to a transmitter in a quantum key distribution technique utilizing an optical signal of a single-photon level.

The present invention may be embodied in other specific forms without departing from the spirit or essential characteristics thereof. The above-described exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An optical transmitter for transmitting optical pulses which are phase-modulated and intensity-modulated, comprising:
   a light source for generating optical pulses;
   a double-pulse generator for generating double pulses from an optical pulse, wherein the double pulses are a temporally separated optical pulse pair;
   a branching section for branching each of the double pulses into a first path and a second path;
   a first optical modulator provided on the first path;
   a second optical modulator and a third optical modulator which are provided in series on the second path; and
   a combining section for combining double pulses having traveled through the first path and double pulses having traveled through the second path to generate an output double pulses,
   wherein each of the first optical modulator and the second optical modulator performs either relative intensity modulation or relative phase modulation between double pulses passing through, wherein the third optical modulator performs relative phase modulation between double pulses passing through.

2. The optical transmitter according to claim 1, wherein the third optical modulator switches its modulation phase between 0° and 90°.

3. The optical transmitter according to claim 1, wherein each of the first optical modulator and the second optical modulator is a Mach-Zehnder optical intensity modulator having a predetermined transfer curve.

4. The optical transmitter according to claim 2, wherein each of the first optical modulator and the second optical modulator is a Mach-Zehnder optical intensity modulator having a predetermined transfer curve.

5. The optical transmitter according to claim 3, wherein the first optical modulator switches its operation point between a minimum point and a first operation point of the transfer curve and the second optical modulator switches its operation point between the minimum point and a second operation point of the transfer curve, wherein the first operation point and the second operation point are positioned symmetrically with respect to the minimum point on the transfer curve.

6. The optical transmitter according to claim 4, wherein the first optical modulator switches its operation point between a minimum point and a first operation point of the transfer curve and the second optical modulator switches its operation point between the minimum point and a second operation point of the transfer curve, wherein the first operation point and the second operation point are positioned symmetrically with respect to the minimum point on the transfer curve.

7. The optical transmitter according to claim 1, wherein the first optical modulator is a Mach-Zehnder optical intensity modulator having a predetermined transfer curve and the second optical modulator is an optical phase modulator.

8. The optical transmitter according to claim 2, wherein the first optical modulator is a Mach-Zehnder optical intensity modulator having a predetermined transfer curve and the second optical modulator is an optical phase modulator.

9. The optical transmitter according to claim 7, wherein the first optical modulator switches its intensity between a minimum point and a maximum point of the transfer curve and the second optical modulator switches its modulation phase between 0° and 180°.

10. The optical transmitter according to claim 8, wherein the first optical modulator switches its intensity between a minimum point and a maximum point of the transfer curve and the second optical modulator switches its modulation phase between 0° and 180°.

11. The optical transmitter according to claim 1, wherein each of the first optical modulator and the second optical modulator is an optical phase modulator.

12. The optical transmitter according to claim 2, wherein each of the first optical modulator and the second optical modulator is an optical phase modulator.

13. The optical transmitter according to claim 11, wherein each of the first optical modulator and the second optical modulator switches its modulation phase between 0° and 180°.

14. The optical transmitter according to claim 12, wherein each of the first optical modulator and the second optical modulator switches its modulation phase between 0° and 180°.

15. The optical transmitter according to claim 1, further comprising an optical attenuator for attenuating optical intensity of the output double pulses.

16. A quantum key distribution system using the optical transmitter according to claim 15.

17. A control method of a composite modulator which is structured such that a first optical modulator is connected on a first path of a Mach-Zehnder interferometer and a second optical modulator and a third optical modulator are connected in series on a second path of the Mach-Zehnder interferometer, comprising:
   each of the first optical modulator and the second optical modulator performing either relative intensity modulation or relative phase modulation between double pulses passing through; and
   the third optical modulator performing relative phase modulation between double pulses passing through.

18. The control method according to claim 17, wherein the third optical modulator switches its modulation phase between 0° and 90°.

19. The control method according to claim 17, wherein each of the first optical modulator and the second optical modulator is a Mach-Zehnder optical intensity modulator having a predetermined transfer curve,
   wherein the first optical modulator switches its operation point between a minimum point and a first operation point of the transfer curve and the second optical modulator switches its operation point between the minimum point and a second operation point of the transfer curve,
   wherein the first operation point and the second operation point are positioned symmetrically with respect to the minimum point on the transfer curve.

20. The control method according to claim 18, wherein each of the first optical modulator and the second optical modulator is a Mach-Zehnder optical intensity modulator having a predetermined transfer curve,
   wherein the first optical modulator switches its operation point between a minimum point and a first operation point of the transfer curve and the second optical modulator switches its operation point between the minimum point and a second operation point of the transfer curve,
   wherein the first operation point and the second operation point are positioned symmetrically with respect to the minimum point on the transfer curve.

21. The control method according to claim 17, wherein the first optical modulator is a Mach-Zehnder optical intensity modulator having a predetermined transfer curve and the first optical modulator switches its intensity between a minimum point and a maximum point of the transfer curve and the second optical modulator switches its modulation phase between 0° and 180°.

22. The control method according to claim 18, wherein the first optical modulator is a Mach-Zehnder optical intensity modulator having a predetermined transfer curve and the first optical modulator switches its intensity between a minimum point and a maximum point of the transfer curve and the second optical modulator switches its modulation phase between 0° and 180°.

23. The control method according to claim 17, wherein each of the first optical modulator and the second optical modulator is an optical phase modulator, wherein each of the first optical modulator and the second optical modulator switches its modulation phase between 0° and 180°.

24. The control method according to claim 18, wherein each of the first optical modulator and the second optical modulator is an optical phase modulator, wherein each of the first optical modulator and the second optical modulator switches its modulation phase between 0° and 180°.

25. A program stored on a non-transitory computer readable medium which functions a computer to control a composite modulator which is structured such that a first optical modulator is connected on a first path of a Mach-Zehnder interferometer and a second optical modulator and a third optical modulator are connected in series on a second path of the Mach-Zehnder interferometer, comprising:
   each of the first optical modulator and the second optical modulator performing either relative intensity modulation or relative phase modulation between double pulses passing through; and
   the third optical modulator performing relative phase modulation between double pulses passing through.

* * * * *